(12) United States Patent
Krasilnikov et al.

(10) Patent No.: US 11,561,821 B1
(45) Date of Patent: Jan. 24, 2023

(54) CONTROLLING PLACEMENT OF VIRTUALIZED RESOURCES BASED ON DESIRABILITY INDEX FOR HOST POOLS

(71) Applicant: Amazon Technologies, Inc., Seattle, WA (US)

(72) Inventors: Nikolay Krasilnikov, Seattle, WA (US); Jose Matias Dobovsek, Dresden (DE); Ethan John Faust, Seattle, WA (US); Maya Kathleen Hess, Seattle, WA (US); Alexey Gadalin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 16/869,330

(22) Filed: May 7, 2020

(51) Int. Cl.
 *G06F 9/455* (2018.01)
 *G06F 9/48* (2006.01)
 *G06F 8/71* (2018.01)

(52) U.S. Cl.
 CPC .......... *G06F 9/4856* (2013.01); *G06F 8/71* (2013.01); *G06F 9/45558* (2013.01); *G06F 2009/4557* (2013.01); *G06F 2209/5011* (2013.01)

(58) Field of Classification Search
 CPC .................................................. G06F 9/4856
 USPC ............................................................ 718/1
 See application file for complete search history.

(56) References Cited

U.S. PATENT DOCUMENTS

| | | | |
|---|---|---|---|
| 7,600,219 B2 * | 10/2009 | Tsantilis | G06F 8/71 707/999.203 |
| 8,850,434 B1 * | 9/2014 | Butikofer | G06F 9/5088 718/1 |
| 9,928,099 B1 * | 3/2018 | Surani | H04L 41/0897 |
| 10,091,138 B2 * | 10/2018 | Szabo | G06F 9/45558 |
| 10,261,775 B1 * | 4/2019 | Ramsay | G06F 8/65 |
| 2009/0070771 A1 * | 3/2009 | Yuyitung | G06Q 10/06 713/323 |
| 2011/0185348 A1 * | 7/2011 | Cordesse | G06F 8/65 717/170 |
| 2011/0231839 A1 * | 9/2011 | Bennett | G06F 3/0683 718/1 |
| 2012/0054410 A1 * | 3/2012 | Vaghani | G06F 3/0664 711/6 |
| 2013/0086582 A1 * | 4/2013 | Cardona | H04L 69/00 718/1 |

(Continued)

OTHER PUBLICATIONS

Nabi-et al: "Rolling Upgrade with Dynamic Batch Size for Iaas Cloud" 2016 IEEE 9th International Conference on Cloud Computing, p. 497-504.*

*Primary Examiner* — Mehran Kamran

(74) *Attorney, Agent, or Firm* — Lee & Hayes, P.C.

(57) ABSTRACT

Various techniques for managing heat and backwards-incompatible updates in cloud-based networks are described. In an example method, a virtualized resource, is identified. At least one first host may include an updated version of an element and at least one second host may include a previous version of the element. The updated version may be incompatible with the previous version. A first desirability index corresponding to the at least one first host may be less than a second desirability index corresponding to the at least one second host. The virtualized resource may be live-migrated from the source host to a target host among the at least one first host.

18 Claims, 12 Drawing Sheets

(56) References Cited

U.S. PATENT DOCUMENTS

| | | | |
|---|---|---|---|
| 2013/0227551 A1* | 8/2013 | Tsirkin | G06F 9/45558 718/1 |
| 2014/0068608 A1* | 3/2014 | Kulkarni | G06F 9/45558 718/1 |
| 2014/0344395 A1* | 11/2014 | Alexander | G06F 9/4856 709/217 |
| 2015/0169320 A1* | 6/2015 | Ahmed | G06F 8/71 717/122 |
| 2015/0261581 A1* | 9/2015 | Wang | G06F 9/5088 711/162 |
| 2015/0261842 A1* | 9/2015 | Huang | H04L 63/20 707/758 |
| 2015/0309839 A1* | 10/2015 | Lu | G06F 9/5077 718/1 |
| 2015/0324217 A1* | 11/2015 | Shilmover | G06F 9/45558 718/1 |
| 2016/0154664 A1* | 6/2016 | Iwamatsu | G06F 9/45558 718/1 |
| 2016/0306648 A1* | 10/2016 | Deguillard | G06F 3/0664 |
| 2017/0075716 A1* | 3/2017 | Bennett | G06F 9/45558 |
| 2018/0088925 A1* | 3/2018 | Emeis | G06T 11/206 |
| 2018/0246757 A1* | 8/2018 | Li | G06F 9/45558 |
| 2018/0314541 A1* | 11/2018 | Khan | G06F 9/45558 |
| 2018/0349164 A1* | 12/2018 | Asayag | G06F 9/45558 |
| 2019/0114165 A1* | 4/2019 | Ghiondea | G06F 8/71 |
| 2019/0294463 A1* | 9/2019 | Mukhopadhyay | G06F 9/45558 |
| 2020/0042340 A1* | 2/2020 | Wiggers | G06F 9/5077 |
| 2020/0241910 A1* | 7/2020 | Verma | G06F 9/5077 |
| 2020/0364086 A1* | 11/2020 | Gavali | G06F 11/3414 |
| 2021/0157624 A1* | 5/2021 | Saxena | G06F 9/45558 |
| 2021/0165694 A1* | 6/2021 | Nabi | G06F 9/5027 |
| 2021/0200573 A1* | 7/2021 | Cao | G06F 9/48 |
| 2021/0279047 A1* | 9/2021 | McLaren | G06F 11/3692 |

\* cited by examiner

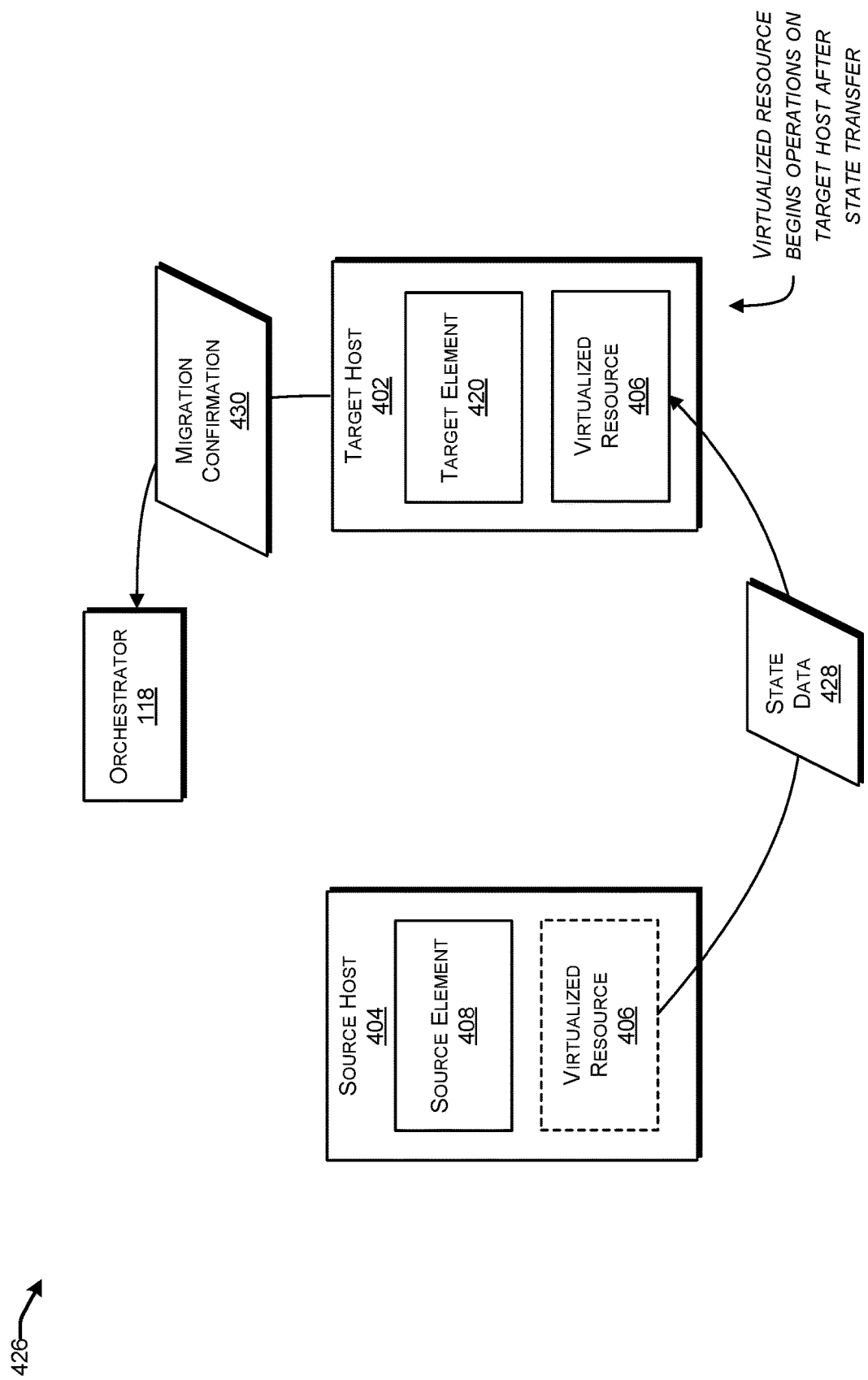

CONTROLLING PLACEMENT OF VIRTUALIZED RESOURCES BASED ON DESIRABILITY INDEX FOR HOST POOLS

BACKGROUND

Cloud-based networks can provide on-demand computing resources for use by multiple users. A cloud-based network can include multiple physical servers, which may include processors and memory that can be shared by different virtualized resources associated with different users. In some examples, the physical servers can be part of a large-scale fleet. The cloud-based network can dynamically allocate computing resources of a given server to a given virtualized resource.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A to 4C illustrate examples of selecting a target host based on desirability indices in order to manage heat of a source host. FIG. 4A illustrates example signaling for triggering live migration of a virtualized resource operating on the source host, in order to manage heat of the source host. FIG. 4B illustrates signaling for selecting the target host based on desirability indices and for initiating live migration of the virtualized resource from the source host to the target host. FIG. 4C illustrates signaling for finalizing live migration of the virtualized resource to the target host.

DETAILED DESCRIPTION

Figure 1:
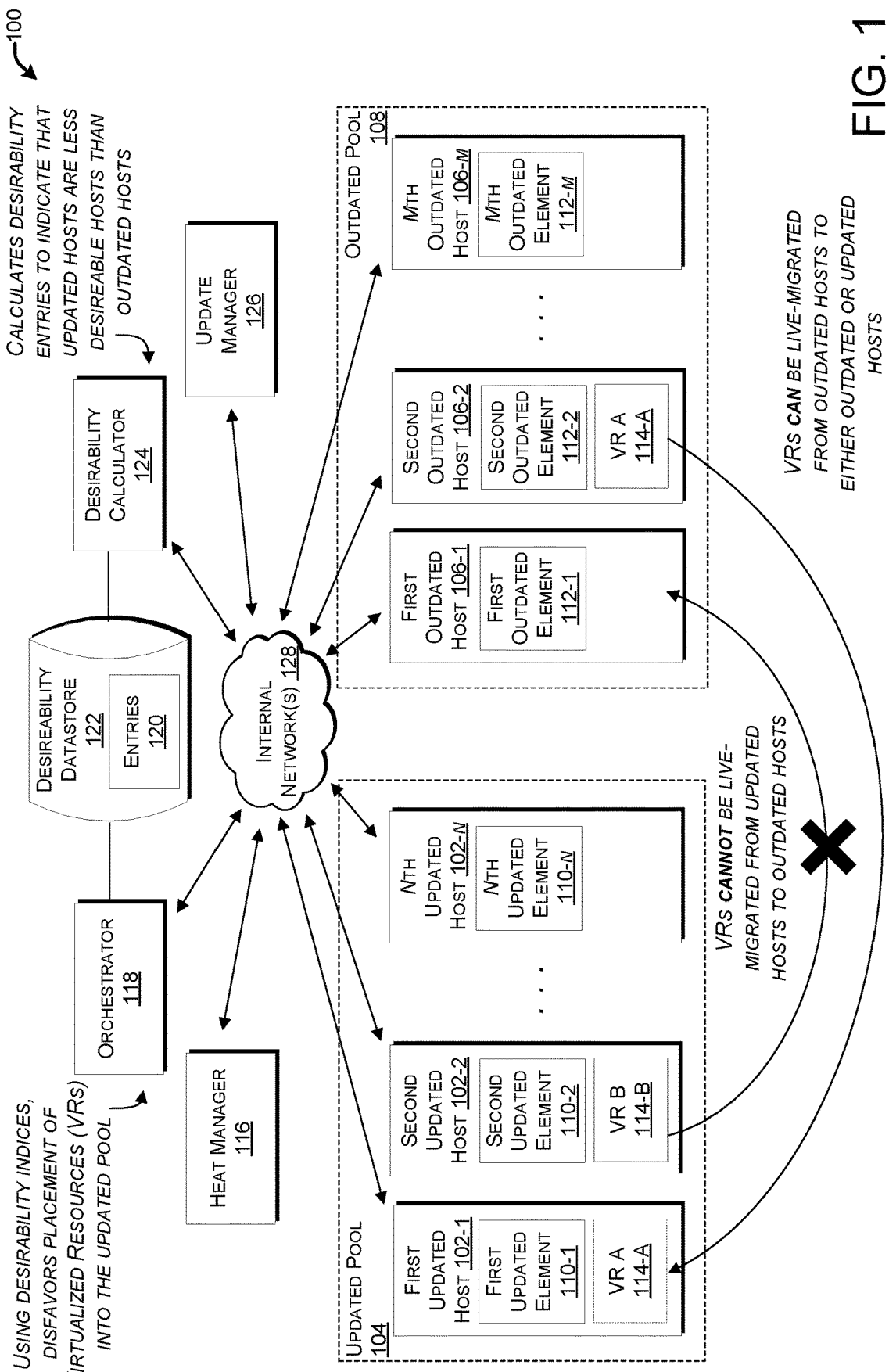
FIG. 1 illustrates an example data center environment for disfavoring migration to hosts with backwards-incompatible updates.

This disclosure describes various techniques for reducing the risk of overwhelming specific pools of compute capacity in a fleet by selectively provisioning virtualized resources on hosts, and live migrating virtualized resources to hosts, that have not recently undergone backwards-incompatible updates.

Live migration can be used to migrate a virtualized resource without significantly interrupting its operations. For example, data associated with the virtualized resource may be copied from a source host to a target host as the virtualized resource is operating on the source host. Once the data has been copied, state information associated with the virtualized resource can be transferred from the source host to the target host, and the operations of the virtualized resource may resume on the target host. Thus, a virtualized resource may live migrate between hosts without pausing its operations in a manner noticeable by the end user.

In various cases, live migration can be used to provide a good customer experience, for example by live migrating a virtualized resource away from a host that requires maintenance and thus will experience some down time, such that the host can be updated while the virtual machine continues to run on another host. In a further example, live migration can be used to move a virtualized resource away from a host that has been predicted to experience a failure. As another example, live migration can be used to move virtualized resources away from a "noisy neighbor." For instance, in some scenarios operating profiles can be determined by measuring what levels of resources (e.g., CPU, memory, network, disk) virtual machines typically consume so that virtual machines with complementary, rather than overlapping, profiles can be placed on the same host. Such "oversubscription" techniques can analyze such profiles to ensure that each virtual machine executing on a host has readily available to it the amount of each resource that it typically requires. However, even with such careful analysis, if a particular virtual machine deviates from its profile and begins consuming more of a particular resource than expected, this "noisy neighbor" could impact the operation of other virtual machines on the same host. Thus, live migration can be used to move the noisy neighbor and/or other virtual machines to continue providing each virtual machine the resources that it requires. This process can be part of a technique referred to as "heat management."

Although live migration can be an important tool for managing resources within a fleet of hosts, it has some limitations. In particular, some updates (e.g., software, hardware, firmware, etc.) performed on the hosts may interfere with the state transfer of a virtualized resource during live migration, such that a particular virtual machine is able to successfully migrate to a host with the updates but is unable to be migrated back to a host without the updates. These updates may be referred to as "backwards-incompatible" updates. One example of a backwards-incompatible update is a resource manager (e.g., a hypervisor, a kernel, software running on an offload card, embedded software, etc.) update. A virtualized resource operating on an updated source host may be unable to live migrate to an outdated target host. Live migration of the virtualized resource may be limited only to similarly up-to-date, or more updated, target hosts. This can be particularly problematic when the updated capacity pool is still small (relative to other capacity pools), such that existing placement techniques that prefer the new/updated capacity pool quickly overwhelm the pool. The resulting impact can be that the virtual machines placed on hosts in that capacity pool have limited opportunities to be live migrated, for example for maintenance or heat management reasons.

To prevent these and other problems, desirability indices associated with the hosts can be used to identify targets for placement and/or migration, wherein the desirability indices of the hosts within the fleet may be dependent on whether the hosts have been updated with backwards-incompatible updates (and optionally additionally based on the capacity remaining in a pool of such updated hosts). In various cases, a host that has undergone a backwards-incompatible update may be associated with a desirability index that indicates that the host is not a preferred target host. The desirability indices can also depend on other factors. For example, the index associated with a given host may increase if the host has unused capacity, has preferred hardware configurations, has undergone backwards compatible updates, or the like. A placement service or orchestrator may preferentially migrate virtualized resources to hosts associated with high indices, and may preferentially avoid migrating virtualized resources to hosts associated with low indices (or vice versa). In various examples described herein, when a host undergoes a backwards-incompatible update, the desirability index associated with the host may decrease. Accordingly, the orchestrator may preferentially migrate virtualized resources to relatively outdated hosts. By doing so, the orchestrator can maximize the liquidity of the virtualized resources in order to more efficiently address future maintenance or heat management conditions. In various implementations, a desirability index can be associated with one or more hosts, such as a pool of hosts. For instance, a pool of hosts that have undergone a backwards-incompatible update may be associated with a lower desirability index than a desirability index associated with a pool of hosts that have not undergone the backwards incompatible update. A target host within a pool of hosts can therefore be selected based on a desirability index. In some cases, the target host can be selected, among the pool, based on other features of the target host (e.g., available capacity, etc.).

Various implementations will now be described with reference to the accompanying figures. Throughout the following description, each reference numeral may refer to at least similar elements, structures, functions, or the like. The implementations shown in the figures and described herein are merely exemplary and are not intended to limit the scope of the appended claims.

FIG. 1 illustrates an example data center environment 100 for disfavoring migration to hosts with backwards-incompatible updates. This environment can be a cloud provider network. A cloud provider network (sometimes referred to simply as a "cloud") refers to a pool of network-accessible computing resources (such as compute, storage, networking resources, applications, and services), which may be virtualized, shared, and/or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network, or the like) and the hardware and software in cloud provider data centers that provide those services.

The cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned geographically far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a virtual private network (VPN) or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Referring back to FIG. 1, the computing resources within the environment 100 can correspond to a fleet of hosts. As used herein, the term "host," and its equivalents, can refer to one or more physical devices (e.g., one or more physical servers) configured to provide computing resources (e.g., one or more of CPU, GPU, memory, disk, and networking resources). The hosts within the environment 100 may be configured to accommodate virtualized resources within their respective computing resources.

The fleet may include first through nth updated hosts 102-1 to 102-$n$ in an updated pool 104, as well as first through mth outdated hosts 106-1 to 106-$n$ in an outdated pool 108. The first to nth updated hosts 102-1 to 102-$n$ can respectively include updated elements 110-1 to 110-$n$. Throughout this description, the term "updated host 102" may refer to any one of the first through nth updated hosts 102-1 to 102-$n$. Similarly, the term "updated element 110" can refer to any one of the updated elements 110-1 to 110-$n$. The updated element 110 may include at least one of software, firmware, or hardware within the corresponding updated host 102.

Any one of the first to mth updated hosts 106-1 to 106-$m$ can include an outdated element 112. Throughout this description, the term "outdated host 106" may refer to any one of the first through mth outdated hosts 106-1 to 106-$m$. Similarly, the term "outdated element 112" can refer to any one of the outdated elements 112-1 to 112-$m$. In various examples, the outdated element 112 may be a previous version of the updated element 110. For instance, the outdated element 112 may include a previous version of a hypervisor installed in the corresponding outdated host 106 and the updated element 110 may include an updated version of the hypervisor installed in the corresponding updated host 102. In various implementations, the outdated element 112 may correspond to the updated version and the updated element 110 may correspond to the previous version.

According to various examples, the updated element 110 and the outdated element 112 may be different versions of the same element.

In various implementations, the updated element 110 may be incompatible with the outdated element 112. According to some examples, the updated element 110 and the outdated element 112 may support incompatible states. As used herein, the term "state" can refer to data corresponding to previous functions and/or actions that impact future functions and/or actions. For example, a state of software can correspond to the content of data generated and/or utilized by the software as well as physical addresses at which the data is stored within a physical memory system corresponding to the software. Thus, an updated version of software may be incompatible with a previous version of the software in examples in which the updated version stores data in different types of addresses within a physical memory system than the outdated version. Some examples of software that can have incompatible states include resource managers (e.g., hypervisors), kernels, firmware, or the like. In some instances, a state of hardware can correspond to data stored in sequential logic elements at a particular point in time. Accordingly, an updated version of hardware may be incompatible with a previous version of the hardware, if the two versions of hardware have differently oriented and/or configured logic elements.

In various examples, different versions of software running on offload cards may be incompatible with one another. An offload card may be an additional hardware element coupled to a host (e.g., any one of the first to nth updated hosts 102-1 to 102-n or the first to mth outdated hosts 106-1 to 106-m). In some implementations, at least a subset of virtualization management tasks of a host may be performed at one or more offload cards so as to enable more of the processing capacity of the host to be dedicated to client-requested compute instances—e.g., cards connected via peripheral component interconnect (PCI) or PCI express (PCIe) to the physical CPUs and other components of the virtualization host may be used for some virtualization management components. Such an offload card of the host can include one or more CPUs that are not available to virtualized resources (e.g., customer instances), but rather are dedicated to management tasks such as virtualized resource management (e.g., a hypervisor), input/output virtualization to network-attached storage volumes, local migration management tasks, virtualized resource health monitoring, and the like. Software running on the offload card may be used to perform any of these functions of the offload card. In various examples, the updated element 110 may be a first version of software running on an offload card and the outdated element 112 may be a second version of the software. These versions may be incompatible with each other, such that the state of a virtualized resource operating on any of the first to nth updated hosts 102-1 to 102-n with the updated element 110 is incompatible with the outdated element 112 of any of the first to mth outdated hosts 106-1 to 106-m.

Any one of the first to nth updated hosts 102-1 to 102-n and/or any one of the first to mth outdated hosts 106-1 to 106-m may be configured to accommodate one or more virtualized resources (also referred to as "VRs"), such as virtualized resource A 114-A and virtualized resource B 114. As used herein, the term "virtualized resource" can refer to software and/or data that can be hosted by a host device, such as a server. Examples of virtualized resources include, for instance, Virtual Machines (VMs) (also referred to as "instances" or "compute instances"), software instances, services, applications, or the like. In various examples, a single virtualized resource may be associated with a single user or entity (e.g., a corporation, a business, a government agency, a non-profit, other type of organization, etc.), a single user or organizational account, or group of users or entities. For the purposes of this discussion, the terms "user" and "entity" can be used interchangeably throughout this disclosure. In some cases, a virtualized resource can be hosted by multiple physical servers, simultaneously. In some cases, a host can be multitenant, which refers to a single physical server that is configured to run multiple virtualized resources (which may belong to different end users), simultaneously. In some cases, a host can be a "bare-metal server," which may be a single physical server configured to run a single resource at a particular time.

Any of the first to nth updated hosts 102-1 to 102-n and/or the first to mth outdated hosts 106-1 to 106-m can accommodate virtualized resources via one or more local computing resources. As used herein, the terms "computing resource," "compute resources," "resources," and their equivalents, can refer to at least one of processing resources, memory resources, cache resources, service resources, or the like, of one or more hosts. The term "processing resource," and its equivalents, may refer to the availability of at least a portion of one or more physical processors (e.g., a portion of CPUs) within a host to process data. The terms "memory resource," "storage resource, and their equivalents, may refer to the availability of at least a portion of one or more physical memory systems (e.g., Random Access Memory (RAM)) within a host to store data. The term "cache resource," and its equivalents, can refer to the availability of a capacity in a RAM and/or in-memory engine within a host to cache data at least temporarily. The term "service resource," and its equivalents, may refer to the availability of one or more services hosted by a host to perform requested operations. In various implementations described herein, the term "capacity" can refer to an amount of one or more computing resources in a host and/or a communication network. For instance, a capacity of a processing resource can be in units of Gigahertz (GHz), a capacity of a memory resource can be in units of Megabytes (MB), Gigabytes (GB), or the like. In some multitenancy examples, a first capacity of a resource (e.g., a memory resource) may be allocated to a first virtualized resource and a second capacity of the resource may be allocated to a second virtualized resource, wherein a total capacity of the resource may be at least as large as a combination (e.g., a sum) of the first capacity and the second capacity. The term "available capacity," and its equivalents, may refer to an amount of unused or available resources within a particular host or communication network. The updated element 110 of the corresponding updated host 102 may be an example of a computing resource that can be used by the updated host 102 to accommodate a virtualized resource. Similarly, the outdated element 112 of the corresponding outdated host 106 can be an example of a computing resource that can be used by the outdated host 106 to accommodate a virtualized resource.

The environment 100 may include a heat manager 116, which may be configured to identify any host among the first to nth updated hosts 102-1 to 102-n and/or the first to mth outdated hosts 106-1 to 106-m whose computing resources may be at least temporarily overburdened or at risk of being overburdened. The heat manager 116 may be implemented as at least one computing system and/or software executing on at least one computing system. For example, the heat manager 116 may be implemented by at least one virtualized resource executing on at least one host. As used herein, the term "heat" can refer to an amount of used and/or burdened computing resources of a host. The heat of a host may refer, in some cases, to an amount of utilized capacity corresponding to the host. In some examples, the heat of a host may refer to at least one of an amount of processing resources, an amount of memory resources, an amount of cache resources, or an amount of service resources of the host that are in use at a given time. The heat manager 116 may be configured to identify one or more oversubscribed hosts within the first to nth updated hosts 102-1 to 102-*n* and/or the first to mth outdated hosts 106-1 to 106-*m*. As used herein, the term "oversubscribed" can refer to a status of a host whose heat is greater than a threshold. The threshold may be defined as an amount and/or percentage of a total capacity of at least one computing resource of the host. For example, a host may be oversubscribed when a CPU usage of the host is greater than a threshold, when a memory usage of the host is greater than a threshold, or the like. A host that is not oversubscribed may be undersubscribed. As used herein, the term "undersubscribed" can refer to a status of a host whose heat is less than or equal to a threshold.

The heat of any one host among the first to nth updated hosts 102-1 to 102-*n* and/or the first to mth outdated hosts 106-1 to 106-*m* can correspond to conditions of the virtualized resources that it accommodates. These conditions may change over time. For example, virtualized resource A 114-A may utilize a greater amount of processing resources of the second updated host 106-2 to process data during the hours of 9 PM to 10 PM than during the hours of 1 AM to 2 AM. In some cases, virtualized resource B 114-B may store a greater amount of data within a local memory of the second updated host 102-2 on Fridays than on Wednesdays. Thus, in order to identify the changing conditions of various hosts within the fleet, the heat manager 116 may evaluate the heat of the first to nth updated hosts 102-1 to 102-*n* and/or the first to mth outdated hosts 106-1 to 106-*m* continuously, periodically, and/or in response to events over time.

Overheating may interfere with a host's performance. A host may flexibly allocate computing resources among virtualized resources that are accommodated by the host, based on dynamic demands by the virtualized resources over time. For example, the second outdated host 106-2 may allocate an amount of CPU resources to the virtualized resource A 114-A during the hours of 9 PM to 10 PM. When the amount of CPU resources is allocated to the virtualized resource A 112, that amount of CPU resources may be unavailable to other virtualized resources that are also accommodated by the second outdated host 106-2 at that time. However, if the processing resources of the second outdated host 106-2 are oversubscribed and any of the other virtualized resources also demand CPU during the hours of 9 AM to 10 PM, the second outdated host 106-2 may lack the available processing resource capacity that can satisfy the demands of the other virtualized resources. As a result, the overheating of the second outdated host 106-2 may prevent the outdated host 106-2 from serving the demands of the other virtualized resources. In some cases, overheating can cause other problems, such as increasing the rate of processing errors, causing physical damage to hardware, or the like. For various reasons, it may be advantageous to prevent overheating within the fleet.

Upon identifying that any of the hosts are oversubscribed or at risk of overheating, the heat manager 116 may request an orchestrator 118 to migrate virtualized resources away from the oversubscribed hosts. The orchestrator 118 may be implemented as at least one computing system and/or software executing on at least one computing system. For example, the orchestrator 118 may be implemented by at least one virtualized resource executing on at least one host. By moving virtualized resources away from oversubscribed hosts, the heat of the oversubscribed hosts can be at least temporarily reduced. The orchestrator 118 may be configured to identify target hosts by which to migrate virtualized resources. In various examples, the orchestrator 118 may be configured to cause migration of virtualized resources from source hosts to the identified target hosts.

According to various implementations, the orchestrator 118 may track and manage various computing resources and/or virtualized resources within the environment 100. The orchestrator 118 may track which hosts within the fleet are actively hosting virtualized resources, as well as which hosts within the fleet include unoccupied slots (e.g., unoccupied portions of computing resources) that can accommodate virtualized resources. In some cases, the orchestrator 118 may further track types of hosts within the environment 100. For instance, the orchestrator 118 may track memory capacity, processing capacity, and cache capacity of the various computing resources, as well as the operating systems, vendors, versions, or other features of the hosts including the various computing resources. In various implementations, the orchestrator 118 may track the computing resources, virtualized resources, and hosts within the environment 100 via control plane signaling throughout the environment. The orchestrator 118 may be configured to orchestrate migration of virtualized resources between slots and/or hosts within the environment 100. For example, the orchestrator 118 may signal a source host to transmit data associated with a virtualized resource to a destination host that includes an unoccupied slot available for the virtualized resource.

In order to accomplish effective heat management of the fleet without significantly impacting ongoing operations of the virtualized resources hosted by the fleet, the orchestrator 118 may cause virtualized resources to be live migrated from oversubscribed source hosts. As used herein, the term "live migration" can refer to a process by which data associated with a virtualized resource is at least partially pre-copied from a source host to a target host while the virtualized resource is operating on the source host, state data associated with the ongoing operations of the virtualized resource is transferred from the source host to the target host, and the virtualize resource begins operating on the target host with minimal to no interruptions to the virtualized resource's operations. By utilizing live migration to manage heat of the hosts within the fleet, the heat manager 116 and/or the orchestrator 118 can maximize the performance of the fleet and the virtualized resources hosted by the fleet.

Live migration, however, may be impossible in some circumstances. In various implementations, the transfer of state data during live migration may be ineffective if an element of the source host is backwards-incompatible with the corresponding element of the target host. Due to the difference in state between the element of the source host and the target host, the transfer of the state data may nevertheless render the target host unable to resume operations of the migrated virtualized resource.

With reference to FIG. 1, virtualized resources may be migrated from source hosts among outdated pool 108 to target hosts among the updated pool 104 or the outdated pool 108. However, virtualized resources in source hosts among the updated pool 104 may be only migrated to target hosts among the updated pool 104, due to the incompatibilities between the updated element 110 and the outdated element 112. Thus, each virtualized resource hosted within the updated pool 104 may have fewer potential target hosts than each virtualized resource within the outdated pool 108. The heat manager 116 and/or the orchestrator 118 may therefore be less able to manage heat within the updated pool 104 than within the outdated pool 108. As used herein, the terms "pool," "capacity pool," or their equivalents can refer to one or more hosts.

For example, virtualized resource A 114-A may be operating on the second outdated host 106-2. The heat manager 116 may identify that the second outdated host 106-2 is oversubscribed and may request the orchestrator 118 to migrate the virtualized resource A 114-A from the second outdated host 106-2, in order to reduce the heat of the second outdated host 106-2. The orchestrator 118 may choose a target host for the virtualized resource A 114-A among any of the hosts within the updated pool 104 and the outdated pool 108. For instance, the orchestrator 118 may identify that the first updated host 102-1 has an unused slot that can accommodate the virtualized resource A 114-A and may cause the virtualized resource A 114-A to live migrate to the first updated host 102-1. Accordingly, the overheating of the second outdated host 106-2 may be resolved without any significant interruptions to the ongoing operations of the virtualized resource A 112.

Virtualized resource B 114-B may be operating on the second updated host 102-2 with second updated element 110-2. Thus, the migration of virtualized resource B 114-B may be more constrained than the migration of virtualized resource A 112. In some instances, the heat manager 116 may identify that the second updated host 102-2 is oversubscribed and may request the orchestrator 118 to migrate virtualized resource B 114-B from the second updated host 102-2, in order to reduce the heat of the second updated host 102-2. Due to the second updated element 110-2 of the second updated host 102-2, the orchestrator 118 may be unable to choose a target host for the virtualized resource B 114-B among the outdated pool 108. For example, the virtualized resource B 114-B may be unable to be live migrated to the first outdated host 106-1 in the outdated pool 108, due to the incompatibility between the second updated element 110-2 and the first outdated element 112-1 of the first outdated host 106-1. In order to reduce the heat of the second updated host 102-2, the orchestrator 118 may be limited to selecting a target host for the virtualized resource B 114-B among the updated pool 104.

The constraints for live-migration of virtualized resources within the updated pool 104 can interfere with effective heat management throughout the fleet. To address these and other issues, placement of virtualized resources in the first to nth updated hosts 102-1 to 102-n within the updated pool 104 may be deprioritized.

In various implementations of the present disclosure, the orchestrator 118 may select target hosts among the fleet for placement of virtualized resources based on desirability indices associated with the hosts. The virtualized resources may be placed for migration and/or initial launches within the fleet. The desirability indices for each of the hosts within the fleet may be stored within entries 120 of a desirability datastore 122. The desirability datastore 122, and the entries 120 stored in the desirability datastore 122, may be accessible by the orchestrator 118. Thus, in a process of selecting a target host for a virtualized resource, the orchestrator 118 may access at least a portion of the entries 120 corresponding to potential target hosts within the fleet, identify a desirable target host among the potential target hosts based on the desirability indices in the entries 120, and cause live migration of the virtualized resource to the desirable target host.

In some implementations, a single desirability index may correspond to one or more hosts within the fleet. For instance, a first desirability index may correspond to the updated pool 104 and a second desirability index may correspond to the outdated pool 108. In some cases, a single desirability index may correspond to a subgroup of the first to nth updated hosts 102-1 to 102-n, a subgroup of the first to mth outdated hosts 106-1 to 106-m, or the like. Thus, a group of candidate target hosts can be identified according to a desirability index corresponding to the group. A target host can be selected, among the group, based on one or more other factors associated with the target host. For instance, the target host may be the host, among the group, with the lowest CPU utilization level.

The environment 100 may include a desirability calculator 124, which may generate and/or update the desirability indices within the entries 120. The desirability calculator 124 may be implemented as at least one computing system and/or software executing on at least one computing system. For example, the desirability calculator 124 may be implemented by at least one virtualized resource executing on at least one host. In various implementations, the desirability calculator 124 may calculate each desirability index based on an update status of the corresponding host. According to various cases, the desirability calculator 124 may further calculate desirability indices based on other factors, such as available capacity of the hosts, heat levels of the hosts, or the like.

An update manager 126 may be configured to identify updates performed on the hosts within the updated pool 104 and the outdated pool 108. The update manager 126 may be implemented as at least one computing system and/or software executing on at least one computing system. For example, the update manager 126 may be implemented by at least one virtualized resource executing on at least one host. In some implementations, at least one of the heat manager 116, the orchestrator 118, the desirability datastore 122, the desirability calculator 124, or the update manager 126 may be implemented on the same computing system or group of computing systems. The updates identified by the update manager 126 may include backwards-incompatible updates. For example, the update manager 126 may identify that the updated element 110 of any of the first to nth updated hosts 102-1 to 102-n has been updated. In some cases, the update manager 126 may identify when the outdated element 112 of any of the first to mth outdated hosts 106-1 to 106-m is updated and converted into an updated element 110.

In addition, the update manager 126 may further identify backwards-compatible updates. A backwards-compatible update may correspond to a conversion of any type of element within any of the hosts in the updated pool 104 or the outdated pool 108 from a previous version to an updated version, wherein the previous version and the updated version support a consistent state. Thus, a virtualized resource occupying a host with the updated version associated with the backwards-compatible update may be live migrated to a host with the outdated version. Example backwards-compatible updates may be to software and/or hardware. In some cases, a backwards-compatible update may improve the functionality of the updated host. For example, a backwards-compatible may improve the efficiency of the updated host, improve the security of the updated host, or the like.

The update manager 126 may report any identified updates to the desirability calculator 124. In various cases, the desirability calculator 124 may modify existing desirability indices associated with the updated hosts 102-1 to 102-$n$ based on the identified updates. According to some implementations, the update manager 126 may modify the desirability indices corresponding to the first to nth updated hosts 102-1 to 102-$n$ with backwards-incompatible updates to indicate that the first to nth updated hosts 102-1 to 102-$n$ are relatively less desirable as target hosts for virtualized resources. Thus, the orchestrator 118 may be less likely to select any of the first to nth updated hosts 102-1 to 102-$n$ within the updated pool 104 as targets for migration and/or new launches of virtualized resources.

In some cases, the update manager 126 may track, or otherwise identify, the number and/or percentage of the updated hosts 102-1 to 102-$n$ within the fleet. According to various implementations, the update manager 126 may selectively modify the desirability indices of the first to nth updated hosts 102-1 to 102-$n$, to indicate that the first to nth updated hosts 102-1 to 102-$n$ are relatively less desirable as target hosts, when the number and/or percentage of the first to nth updated hosts 102-1 to 102-$n$ is less than a threshold. In various implementations, the capacity constraints for effective heat management of the updated pool 104 may be relatively minimal when n is greater than or equal to the threshold. Accordingly, selecting any of the first to nth updated hosts 102-1 to 102-$n$ as target hosts may have a minimal impact on heat management when n is greater than or equal to the threshold. In some examples, when a higher desirability index corresponds to a more desirable target host, the update manager 126 may reduce the desirability index associated with a first example host among the updated hosts 102-1 to 102-$n$, in response to identifying that n is less than the threshold and that the first example host has undergone a backwards-incompatible update. Further, the update manager 126 may refrain from modifying the desirability index associated with a second example host among the updated hosts 102-1 to 102-$n$, in response to identifying that n is greater than or equal to the threshold and that the second example host has undergone a backwards-incompatible update. In various examples, the threshold can correspond to 50% of the total number of hosts within the fleet, 75% of the total number of hosts within the fleet, 90% of the total number of hosts within the fleet, or some other amount of hosts within the fleet.

In various cases, the desirability calculator 124 may modify the desirability indices corresponding to any of the hosts that have backwards-compatible updates to indicate that those hosts are relatively more desirable as target hosts for virtualized resources. Hosts with backwards-compatible updates may therefore be preferred target hosts. For example, a backwards-compatible update to an operating system of a given host may improve the security posture of the host. In order to protect the security of a maximum number of virtualized resources, while still managing heat within the fleet, the desirability calculator 124 may calculate the desirability index of the given host to indicate that the given host is a desirable target host. Thus, the orchestrator 118 may be more likely to select the given host as a target host for migration and/or a launch of a given virtualized resource.

The environment 100 may further include at least one internal network 128 by which data can be securely and rapidly transferred between various hosts, virtualized resources, and/or other components within the environment 100. The internal network(s) 128 can include one or more wired networks, one or more wireless networks, or a combination thereof. In some cases, the internal network(s) may include an optical fiber network configured to provide high-speed data communication between various entities (e.g., hosts, virtualized resources, devices, routers, switches, and the like) within the environment 100. In various implementations, data can be transmitted over the internal network(s) 128 in the form of packets (e.g., Internet Protocol (IP) packets), segments (e.g., Transmission Control Protocol (TCP)) segments, some other communication protocol, or a combination thereof.

The internal network(s) 128 may be connected to an external network, which may be external to one or more availability zones including the environment 100. The external network, in some cases, may be a public network. As used herein, the term "public network" can refer to any data communication network that can be used to convey the transmission of data between unverified entities. Accordingly, data transmitted over the public network may be vulnerable to interception and/or attacks by nefarious entities connected to the public network. Some examples of a public network include a Wide Area Network (WAN), such as the Internet, a mobile core network (e.g., a $3^{rd}$ Generation (3G) core network, an Evolved Packet Core (EPC), a $5^{th}$ Generation (5G) core network, etc.), a Radio Access Network (RAN), or the like. To maximize security within the environment 100, the internal network(s) 128 may enforce one or more first security policies on data transmitted between the internal network(s) 128 and the external network. For example, the internal network(s) 128 may include a first firewall that intercepts data traffic from the external network. Accordingly, the internal network(s) 128 may be secured from malicious traffic originating outside of the environment 100.

According to various implementations, the placement of virtualized resources (such as virtualized resource A 114-A and virtualized resource B 114-B) in the outdated pool 108 may be prioritized, particularly when the updated pool 104 represents a relatively small portion of the fleet. By prioritizing the placement of virtualized resources in the outdated pool 108, the updated pool 104 may be more likely to maintain a sufficient amount of available capacity to accommodate live migrations of virtualized resources between the first to nth updated hosts 102-1 to 102-$n$. Accordingly, the first to nth updated hosts 102-1 to 102-$n$ may be effectively heat-managed. In various examples described herein, the orchestrator 118 can select target hosts, for migration and/or new launches of virtualized resources, based at least in part on desirability indices of the hosts. The desirability indices may be stored in the desirability datastore 122 and updated by the desirability calculator 124 based, at least partly, on the update statuses of the hosts. For example, when an example host undergoes a backwards-incompatible update and joins the first to nth updated hosts 102-1 to 102-$n$, the desirability index associated with the example host can be modified to indicate that the example host should be less preferred as a target host for a new launch or a migration of a virtualized resource.

In some cases, the desirability indices associated with hosts that undergo backwards incompatible updates may be unmodified by the desirability calculator 124, when the number of updated hosts 102-1 to 102-$n$ is greater than or equal to a threshold number or percentage of hosts within the fleet. As long as the number of updated hosts 102-1 to 102-$n$ is sufficient to effectively heat manage the updated hosts 102-1 to 102-$n$, the placement of virtualized resources in the updated hosts 102-1 to 102-$n$ may no longer be deprioritized. Thus, as backwards-incompatible update is rolled out to a relatively large portion of the fleet, the updated hosts 102-1 to 102-n may be more desirable as target hosts for virtualized resources.

In various examples, the fleet may include a first group of hosts with a first version of an element (e.g., hardware and/or software) and a second group of hosts with a second version of the element. The first and second versions may be different and incompatible with each other, thereby preventing live-migration of virtualized resources from the first group to the second group. In some cases, the second version may be an updated version of the first version, but implementations are not so limited. According to various implementations, the second group may include less than a threshold number and/or percentage of hosts within the fleet. To improve effective heat management of the second group, the placement of virtualized resources within the second group may be deprioritized. For instance, the desirability calculator 124 may calculate the desirability indices of the second group to be lower (e.g., on average) than the desirability indices of the first group. Thus, various implementations described herein can be used to effectively heat manage incompatible hosts within the fleet, regardless of whether the hosts are incompatible due to a gradual update of the fleet or due to some other reason.

Figure 2:
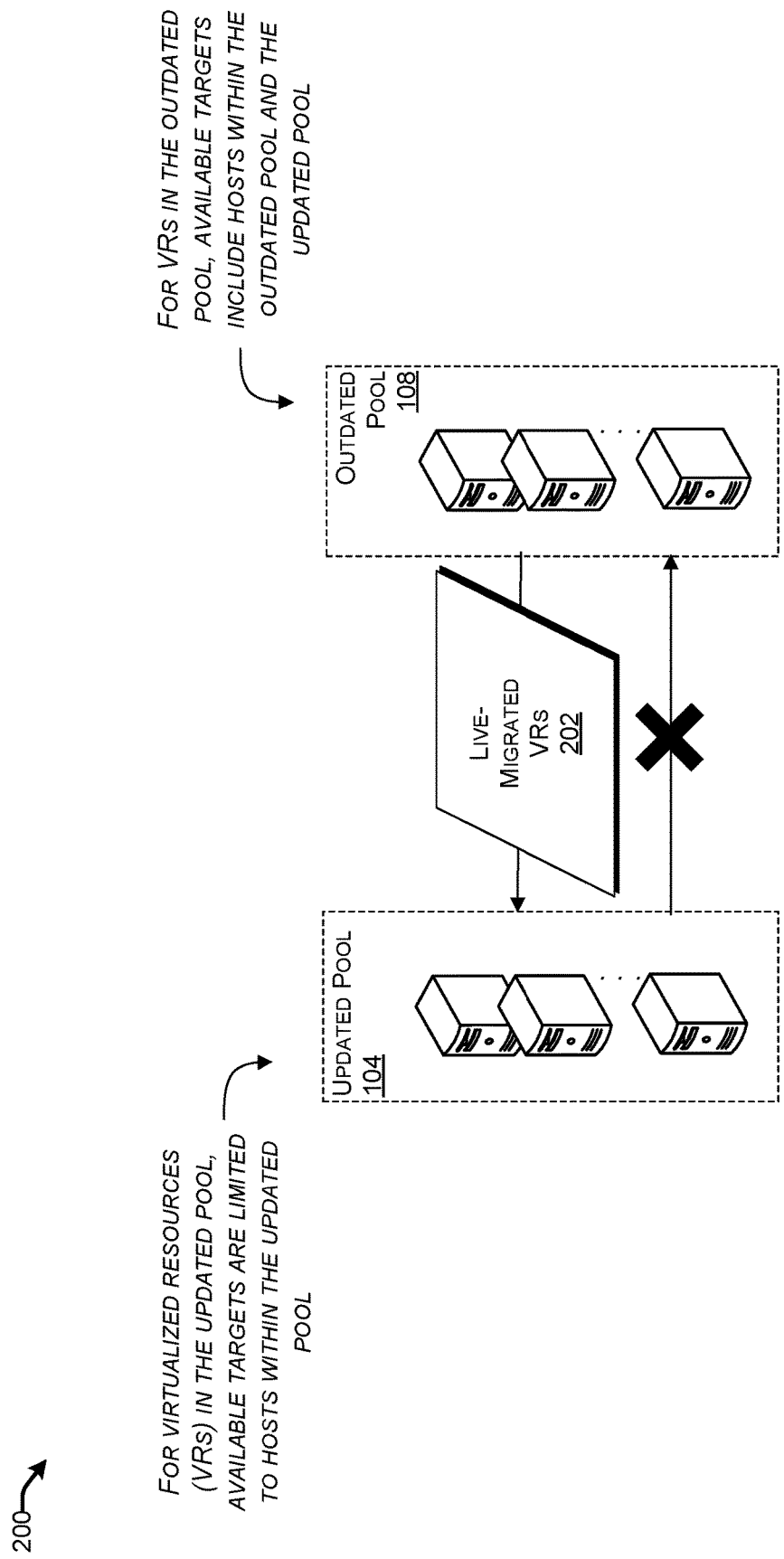
FIG. 2 illustrates an example environment illustrating movement of virtualized resources between a pool of updated hosts and a pool of outdated hosts.

FIG. 2 illustrates an example environment 200 illustrating the movement of virtualized resources 202 between the updated pool 104 and the outdated pool 108. As discussed above with reference to FIG. 1, the updated pool 104 may include hosts with a backwards-incompatible update and the outdated pool 108 may include hosts without the backwards-incompatible update. Various live-migrated virtualized resources 202 may be migrated from outdated hosts (e.g., the first through mth outdated hosts 106-1 to 106-m described above with reference to FIG. 1) within the outdated pool 108 to hosts (e.g., the first through nth updated hosts 102-1 to 102-n) within the updated pool 104. However, due to incompatibilities between updated elements within the hosts of the updated pool 104 and outdated elements within hosts of the outdated pool 108, the live-migrated virtualized resources 202 cannot be transferred from the updated pool 104 to the outdated pool 108. That is, a virtualized resource hosted by the updated pool 104 may have lower migration liquidity than a virtualized resource hosted by the outdated pool 108, wherein the migration liquidity can refer to an amount (e.g., a number) of potential (or "candidate") target hosts by which the virtualized resource can be placed via live migration.

In various implementations, the updated pool 104 may include relatively few hosts when compared to the outdated pool 108. For instance, updating the outdated hosts with the backwards-incompatible update may at least temporarily interrupt the functions of the hosts. Thus, to minimize large-scale interruptions within the fleet, the hosts within the outdated pool 108 may be gradually updated. Once the hosts within the outdated pool 108 are updated, they join the updated pool 104. However, particularly during early stages of updating the fleet, the updated pool 104 may include fewer hosts than the outdated pool 108, and a relatively small percentage of the total fleet. Even in the later stages of updating the fleet, the updated pool 104 may only include a portion of the fleet.

Due to the relatively small number of hosts within the updated pool 104, the updated pool 104 may include a relatively small amount of computing resources, and a relatively small number of slots by which virtualized resources can be placed. Virtualized resources hosted within the outdated pool 108 can be placed in any target host within the fleet with an available slot. A slot may be defined as a portion of computing resources within a host that can be used to accommodate a virtualized resource. Thus, an orchestrator (e.g., the orchestrator 118 described above with reference to FIG. 1) can select any host in the fleet with an available slot as the target host of a virtualized resource originating from a host within the outdated pool 108.

However, the virtualized resources hosted within the updated pool 104 may be only placed in target hosts within the updated pool 104. Thus, the orchestrator can select a host among the updated pool 104 as a target host of a virtualized resource originating from another host within the updated pool 104 and may not select any host in the outdated pool 108 as the target host. The limited number of slots within the updated pool 104 can limit the availability of target hosts for virtualized resources. In circumstances in which the hosts within the updated pool 104 are heat-managed by live-migrating virtualized resources, the limited number of hosts within the updated pool 104 may interfere with effective heat management.

Accordingly, in various implementations of the present disclosure, the number of live-migrated virtualized resources 202 may be minimized. The live-migrated virtualized resources 202 can be minimized by discouraging live-migration of the virtualized resources 202 from the outdated pool 108 to the updated pool 104 and/or discouraging placement of virtualized resources into the updated pool 104. The number of live-migrated virtualized resources 202 may be greater than zero, in order to utilize capacity within the updated pool 104. However, virtualized resources originating from the outdated pool 108 may be preferentially placed in target hosts within the outdated pool 108, rather than the updated pool 104. The preferential placement of virtualized resources operating in source hosts in the outdated pool 108 into target hosts in the outdated pool 108 may be based on desirability indices associated with hosts within the fleet. The desirability indices may be updated based on update statuses of the hosts.

Figure 3:
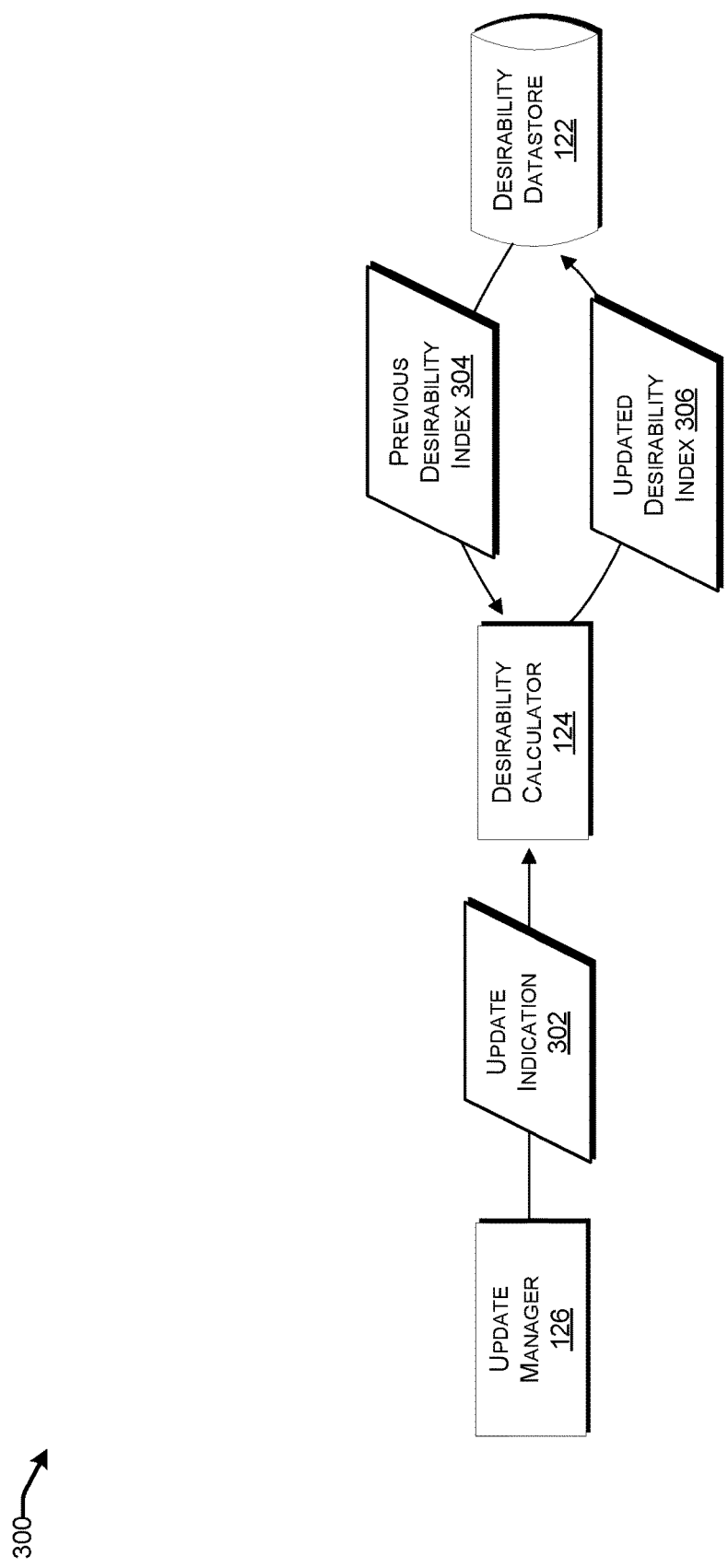
FIG. 3 illustrates example signaling for updating desirability indices based on updates.

FIG. 3 illustrates example signaling 300 for updating desirability indices based on updates. As shown, the signaling 300 is between the desirability datastore 122, the desirability calculator 124, and the update manager, which are described above with reference to FIG. 1. The signaling 300 can include data transmitted over one or more interfaces, one or more communication networks (e.g., the internal network(s) 128), or the like.

An update manager 126 may identify that a host (e.g., one of the first to nth updated hosts 102-1 to 102-n or one of the first to mth outdated hosts 106-1 to 106-m) within a fleet has been updated. Further, the update manager 126 may identify whether the host has been updated with a backwards-compatible update or a backwards-incompatible update. The host may be updated with a backwards-incompatible update when an updated version of an element (e.g., software and/or hardware) within the host handles state data differently than a previous version of the element, such that the state data cannot be translated between the updated version and the previous version. In contrast, the host may be updated with a backwards-compatible update when an updated version of an element (e.g., software and/or hardware) within the host handles state data in a manner that is consistent with the previous version of the element. According to some implementations, the update manager 126 may identify that the host has been updated, as well as whether the update is backwards-compatible or backwards-incompatible, based on control plane signaling throughout the data center environment including the update manager 126. In some cases, a user may input an indication of the update to the update manager 126 directly, or via a message transmitted to the update manager 126.

The update manager 126 may transmit an update indication 302 to the desirability calculator 124. The update indication 302 may indicate that the host that has been updated. For example, the update indication 302 may indicate that an identity (e.g., an identifier) of the host that has been updated. The update indication 302 may indicate that the element of the host that has been updated. For example, if the hypervisor of the host has been updated, the update indication 302 may indicate that the hypervisor has been updated. In some cases, the updated indication 302 may indicate an applicable version of the updated element. According to various examples, the update indication 302 may indicate whether the update is backwards-compatible or backwards-incompatible.

The desirability calculator 124 may update a desirability index of the updated host based on the update indication 302. In various implementations, the desirability datastore 122 may store a previous desirability index 304 associated with the updated host. The previous desirability index 304 may be stored in an entry of the desirability datastore 122 that corresponds to the updated host. In various implementations, the previous desirability index 304 may be a number (e.g., a number between 0 and 100) that correlates with the host's previous desirability as a target host. The desirability calculator 124 may access the previous desirability index 304 in the desirability datastore 122. For example, the desirability calculator 124 may identify the entry based on the identity of the host that has been updated, and read the previous desirability index 304 stored in the desirability datastore 122.

The desirability calculator 124 may generate, based on the previous desirability index 304 and the update indication 302, an updated desirability index 306 corresponding to the updated host. In various implementations in which the update indication 302 indicates that the host has undergone a backwards-compatible update, the desirability calculator 124 may generate the updated desirability index 306 to indicate that the updated host is a more desirable target host than the previous desirability index 304 indicated. For instance, if a higher index corresponds to a more desirable target host, the desirability calculator 124 may generate the updated desirability index 306 by increasing the previous desirability index 304. In various cases in which the update indication 302 indicates that the host has undergone a backwards-incompatible update, the desirability calculator 124 may generate the updated desirability index 306 to indicate that the updated host is a less desirable target host than as indicated in the previous desirability index 304. For instance, if a higher index corresponds to a more desirable target host, the desirability calculator 124 may generate the updated desirability index 306 by decreasing or reducing the previous desirability index 304. In some examples, the desirability calculator 124 may selectively decrease the previous desirability index 304 in response to identifying that the number and/or percentage of hosts within the fleet that have undergone the backwards incompatible update is below a threshold (e.g., 50%).

The desirability calculator 124 may store the updated desirability index 306 in the desirability datastore 122. In various cases, the desirability calculator 124 may write the updated desirability index 306 into the entry of the desirability datastore 122 that corresponds to the updated host. For instance, the previous desirability index 304 may be replaced with the updated desirability index 306 in the entry of the desirability datastore 122.

Figure 4A:
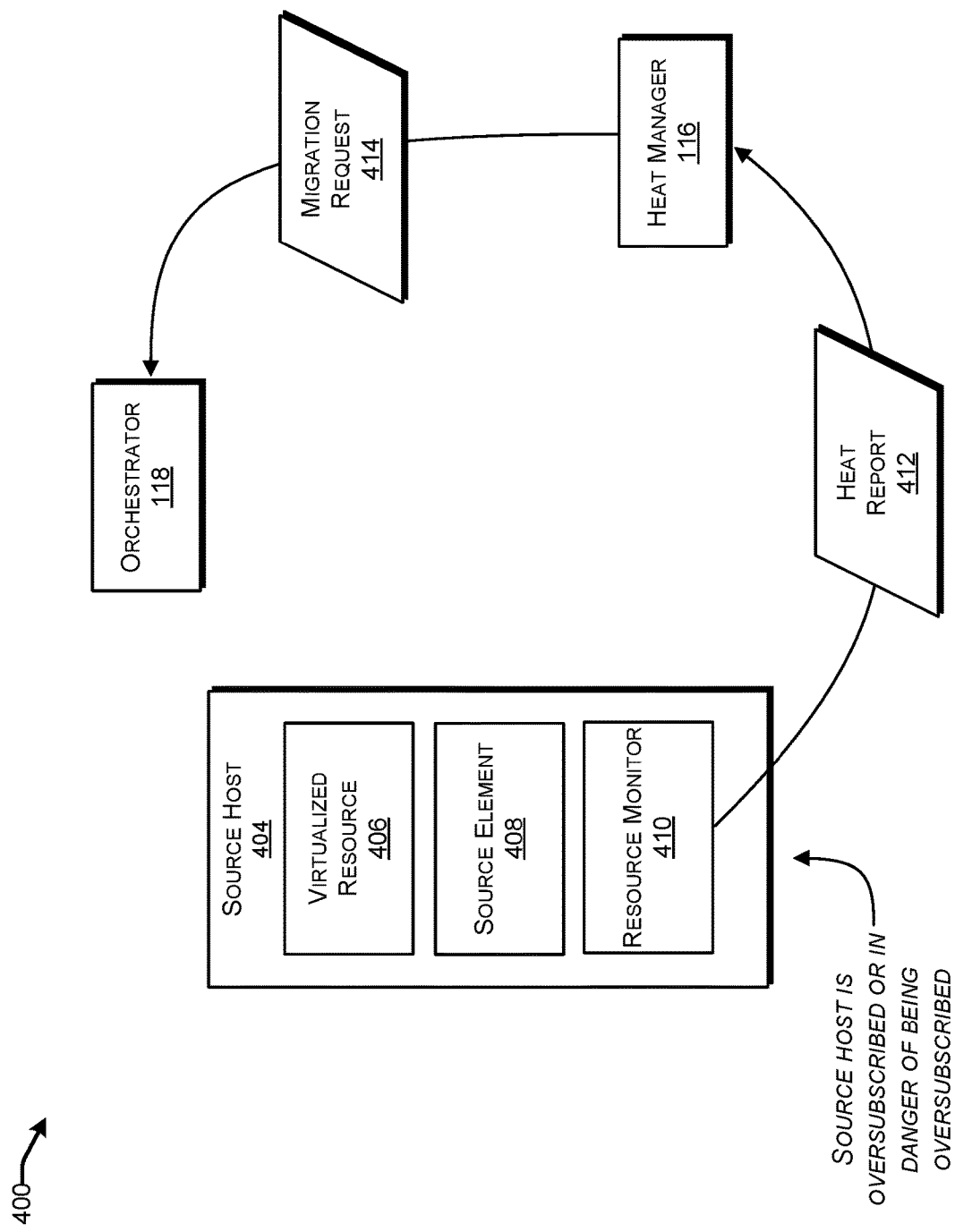
Figure 4B:
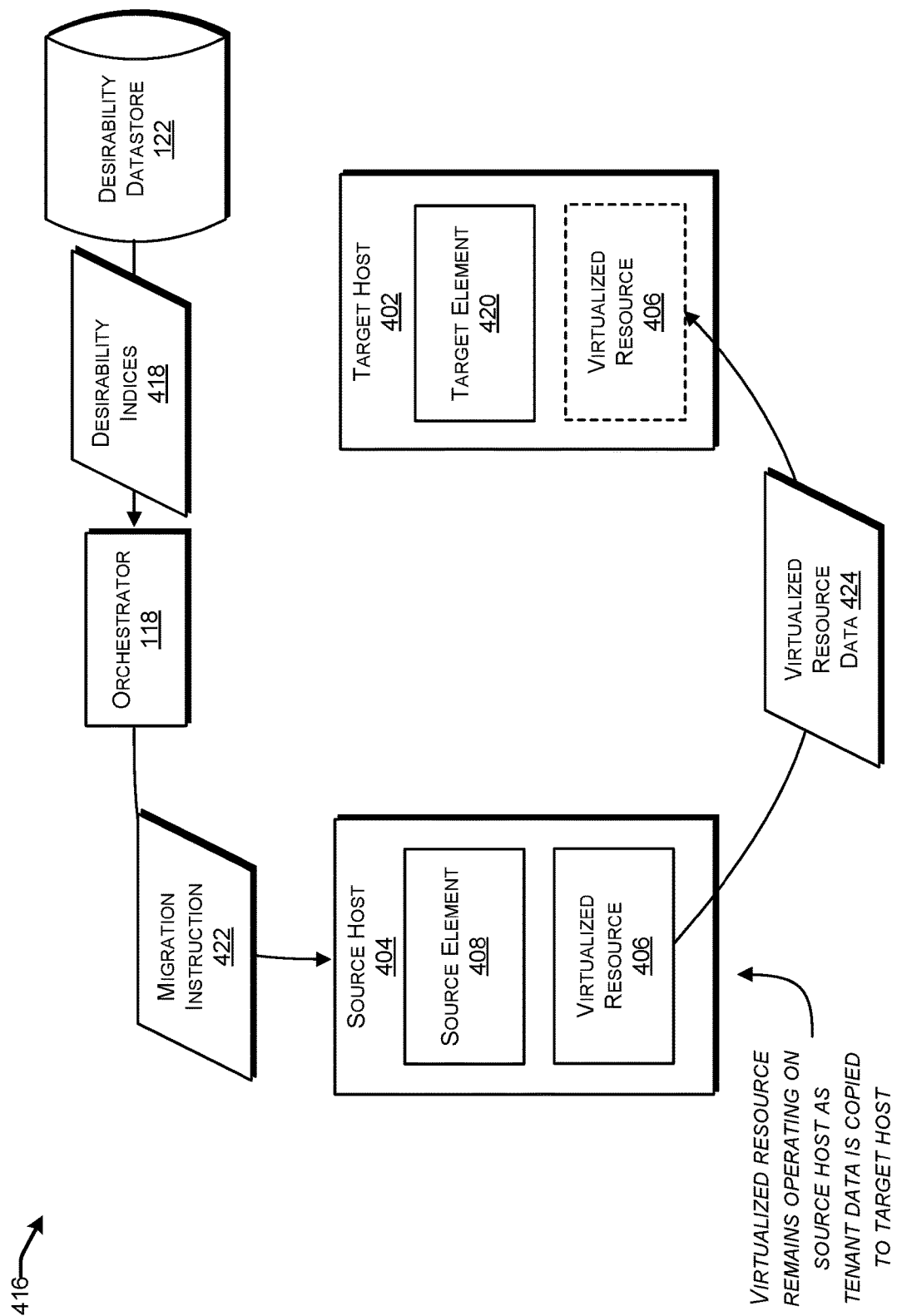

FIGS. 4A to 4C illustrate examples of selecting a target host 402 based on desirability indices in order to manage heat of a source host 404. In various implementations, the target host 402 may include one of the first to nth updated hosts 102-1 to 102-n or one of the first to mth outdated hosts 106-1 to 106-m. The source host 404 may include one of the outdated hosts 106-1 to 106-m, in various cases. FIGS. 4A to 4C illustrate various signals that can include data transmitted over one or more interfaces, one or more communication networks (e.g., the internal network(s) 128), or the like.

FIG. 4A illustrates example signaling 400 for triggering live migration of a virtualized resource 406 operating on the source host 404, in order to manage heat of the source host 404. As illustrated, the signaling 400 is between the heat manager 116 and the orchestrator 118, which are described above with reference to FIG. 1

The source host 404 may include a source element 408. The source element 408 can include hardware and/or software for which an update is available. In various cases, a version of the source element 408 is a previous version.

In various implementations, the source host 404 may include a resource monitor 410. The resource monitor 410 may be configured to identify utilization levels of various computing resources within the source host 404, such as processing resources, memory resources, cache resources, and the like. In various examples, the computing resources of the source host 404 may be shared by multiple virtualized resources occupying the source host 404, such as the virtualized resource 406. The resource monitor 410 may monitor used and/or unused capacity within the computing resources of the source host 404. In some cases, the resource monitor 410 may identify utilization trends by various virtualized resources occupying the source host 404, such as the virtualized resource 406. For example, the resource monitor 410 may identify that the virtualized resources occupying the source host 404 may utilize a higher percentage of available computing resources during a first time of day (e.g., 9 PM to 11 PM each day) than during a second time of day (e.g., 1 AM to 3 AM). Accordingly, the resource monitor 410 may be configured to predict future utilization levels based on current utilization levels and utilization trends.

The source host 404 and/or the resource monitor 410 may be configured to generate a heat report 412 indicating utilization levels of the computing resources of the source host 404 and/or predicted utilization levels of the computing resources. The heat report 412 may be transmitted to the heat manager 116. In some cases, the source host 404 may transmit the heat report 412 in response to identifying that the source host 404 is oversubscribed or in danger of being oversubscribed. The source host 404 may be oversubscribed if an unused capacity of one or more of the computing resources of the source host 404 is less than a threshold level (e.g., 10%), or if a utilization level of the one or more computing resources is greater than a threshold level (e.g., 90%). The source host 404 may be in danger of overheating if, based on the predicted future utilization levels, the source host 404 is predicted to be oversubscribed at a future time. In some examples, the heat report 412 may indicate the virtualized resources occupying the source host 404, such as the virtualized resource 406. According to various instances, the heat report 412 may include an identifier of the virtualized resource 406 as well as current and/or predicted utilization levels of the computing resources of the source host 404 by the virtualized resource 406.

The heat manager 116 may identify that the source host 404 is oversubscribed or is in danger of overheating based on the heat report 412. In some cases, the heat manager 116 may receive multiple heat reports including at least one heat report from a host other than the source host 404. Accordingly, the heat manager 116 may identify one or more hosts including the source host 404 to be heat-managed.

The heat manger 116 may generate and transmit a migration request 414 to the orchestrator 118, based on the heat report 412. In some cases, the migration request 414 can include multiple requests for migration based on the multiple heat reports received from the one or more hosts to be heat-managed. The migration request 414 may request that the virtualized resource 406 occupying the source host 404 be migrated away from the source host 404. The migration request 414 may include at least one of an identifier of the target host 402 (e.g., an IP address of the target host 402, a host identifier of the target host 402, etc.), an identifier of the virtualized resource 406 (e.g., an IP address of the virtualized resource 406, a virtualized resource identifier of the virtualized resource 406, a domain identifier of a slot occupied by the virtualized resource 406, etc.), or the like. Migrating the virtualized resource 406 out of the source host 404 may reduce the heat (e.g., utilized capacity of computing resources) of the source host 404, thereby improving the performance of other virtualized resources that remain operating on the source host 404. The migration request 414 may identify the source host 404. For example, the migration request 414 may specify an identifier of the source host 404. In some cases, the migration request 414 may further identify the virtualized resource 406. In response to the migration request 414, the orchestrator 118 may initiate live migration of the virtualized resource 406 from the source host 404.

FIG. 4B illustrates signaling 416 for selecting the target host 402 based on desirability indices and for initiating live migration of the virtualized resource 406 from the source host 404 to the target host 402. As illustrated, the signaling 416 includes data transmitted between the orchestrator 118 and the desirability datastore 122, which are described above with reference to FIG. 1. In various cases, the signaling 416 can be triggered in response to the orchestrator 118 receiving a migration request (e.g., the migration request 414).

The orchestrator 118 may identify the target host 402 among multiple hosts (e.g., among the first to nth updated hosts 102-1 to 102-n and/or the first to mth outdated hosts 106-1 to 106-m) in a fleet. The orchestrator may access multiple desirability indices 418 stored in the desirability datastore 122, wherein the desirability indices 418 correspond to the multiple hosts in the fleet. Each of the desirability indices 418 may indicate a desirability of a respective host as a target host. In various implementations, the desirability indices 418 may be read by the orchestrator 118 from multiple entries stored in the desirability datastore 122.

In some cases, the desirability indices 418 extracted by the orchestrator 118 may correspond to multiple hosts in the fleet that have unused or unoccupied slots that are sufficient to accommodate the virtualized resource 406. The orchestrator 118 may identify an amount of computing resources (e.g., an amount of memory, an amount of CPU usage, or the like) that the virtualized resource 406 utilizes during operation. The orchestrator 118 may identify hosts among the fleet with sufficient unused capacity to accommodate the amount of computing resources that the virtualized resource 406 utilizes during operation. In some cases, the orchestrator 118 may identify candidate hosts from a list of hosts in a datastore (e.g., stored locally or elsewhere in the data center) indicating that the candidate hosts have enough free capacity to host the virtualized resource 406. The candidate hosts identified by the orchestrator 118 may include undersubscribed hosts. For instance, the candidate hosts may omit hosts that are undersubscribed. In some cases, the orchestrator 118 may specifically select the candidate hosts among hosts with similar capabilities to the source host 404, such as similar memory capacity, similar processing capacity, the same operating system, the same vendor, or the like. In various cases, the orchestrator 118 may selectively extract the desirability indices 418 corresponding to the identified candidate hosts.

In various examples in which the source element 408 has been subject to a backwards-incompatible update, the desirability indices 418 extracted by the orchestrator 118 may correspond to hosts among the fleet that also include elements that are subject to the backwards-incompatible update. Due to the incompatibility between the previous version and the updated version of the source element 408, the target host 402 may include the previous version.

The orchestrator 118 may compare the desirability indices 418. The orchestrator 118 may identify, based on the comparison of the desirability indices 418, that the target host 402 is the most desirable target host, or is among a group of the most desirable target hosts, within the fleet. In some implementations, the target host 402 may include a target element 420, which could be software, hardware, or a combination thereof. The desirability index, among the desirability indices 418, which corresponds to the target host 402 may be based, at least in part, on an update status of the target element 420. For example, the desirability index may indicate that the target host 402 is a relatively desirable target host because the target element 420 is a previous version of an element for which a backwards-incompatible update is available. In some cases, the desirability index may indicate that the target host 402 is a relatively desirable target host because the target element 420 is an updated version of an element that has been subject to a backwards-compatible update. In some implementations, the fleet may lack an unused slot that is configured to accommodate the virtualized resource 406 among hosts that include a previous version of the element for which the backwards-incompatible update is available, and thus the target element 420 of the target host 402 may be an updated version of the element.

In some cases, the orchestrator 118 may confirm whether the virtualized resource 406 is suitable for live-migration. According to various implementations, orchestrator 118 may confirm that the virtualized resource 406 is associated with less than a threshold amount of data (e.g., less than 1 MB, less than 1 GB, or some other amount of data) in local storage of the source host 404. For instance, the orchestrator 118 may access a datastore (e.g., stored locally or elsewhere in the data center) storing an entry indicating that the virtualized resource 406 is associated with less than the threshold amount of data, the migration request 414 itself may indicate that the virtualized resource 406 is associated with less than the threshold amount of data, or the like.

The orchestrator 118 may initiate live migration of the virtualized resource 406 from the source host 404 to the target host 402. The orchestrator may transmit a migration instruction 422 to the source host. The migration instruction 422 may instruct the source host 404 to transfer the virtualized resource 406 to the target host 402. For example, the migration instruction 422 may identify the target host 402, such that the source host 404 can establish a peer-to-peer connection with the target host 402. For example, the migration instruction 422 may include at least one of an identifier of the target host 402 (e.g., an IP address of the target host 402, a host identifier of the target host 402, etc.), an identifier of the virtualized resource 406 (e.g., an IP address of the virtualized resource 406, a virtualized resource identifier of the virtualized resource 406, a domain identifier of a slot occupied by the virtualized resource 406, etc.), or the like. In some implementations, the migration instruction 422 may direct the source host 404 to virtualized resource data 424 to the orchestrator 118, which may forward the virtualized resource data 424 to the destination host 402. That is, the orchestrator 118 may act as a mediator of the transfer of the virtualized resource data 424 from the source host 404 to the destination host 402.

Although not illustrated in FIG. 4B, in some examples, the orchestrator 118 may transmit a reservation instruction to the target host 402 that instructs the target host 402 to reserve a slot that is sufficient to accommodate the virtualized resource 406.

In response to receiving the migration instruction 422, the source host 404 may copy virtualized resource data 424 to the target host 402. The virtualized resource data 424 may include data associated with the virtualized resource 406, such as the virtualized resource data 424 may include various data associated with the particular virtualized resource, such as any combination of data encoding instructions for performing operations of the virtualized resource 406, data stored in a block storage volume associated with the virtualized resource 406, local storage associated with the virtualized resource 406, or the like. However, as the source host 404 is copying the virtualized resource data 424, the virtualized resource 406 may remain operating on the source host 404. For example, at least one processor of the source host 404 may perform operations of the virtualized resource 406 while the virtualized resource data 414 is being copied to the target host 402. During the transfer of the virtualized resource data 424, the virtualized resource 406 may effectively occupy a slot within the source host 404 and a slot within the target host 402, simultaneously. While live migration can increase the utilization of fleet capacity by the virtualized resource 406, interruptions to the operations of the virtualized resource 406 may be minimized.

FIG. 4C illustrates signaling 426 for finalizing live migration of the virtualized resource 406 to the target host 402. As illustrated, the signaling 426 includes data transmitted to the orchestrator 118, which are described above with reference to FIG. 1. In various cases, the signaling 426 can be triggered in response to at least some of the virtualized resource data 424 being transferred to the target host 402.

During live migration of the virtualized resource 406, the virtualized resource 406 may cease operating on the source host 404 and may resume operating on the target host 402. The transfer of the operations of the virtualized resource 406 from the source host 404 to the target host 402 may include the source host 404 transmitting state data 428 to the target host 402. The state data 428 may include data indicating a volatile state of the virtualized resource 406 operating on the source host 404. The state data 428 may correspond to a state of the source element 408, which may be utilized to perform the operations of the virtualized resource 406 as the virtualized resource 406 is operating on the source host 404. Thus, if the source element 408 is an updated version of a backwards-incompatible update, the target element 420 in the target host 402 cannot be a previous version of the backwards-incompatible update. However, if the source element 408 is the previous version, then the target element 420 can be the previous version or the updated version of the backwards-incompatible update.

The state data 428 may be transferred in response to temporarily ceasing operations of the virtualized resource 406 on the source host 404. Upon receiving the state data 428, the virtualized resource 406 may resume operations on the target host 402. A size of the state data 428 may be relatively small (e.g., less than 1 MB). For instance, the size of the state data 428 may be smaller than a size of the virtualized resource data 424. Accordingly, assuming a consistent throughput from the source host 404 to the target host 402, the state data 428 may be transferred to the target host 402 in a shorter amount of time than the virtualized resource data 424. Thus, by continuing operations of the virtualized resource 406 during the transfer of the transfer of the virtualized resource data 424, and by limiting interruptions to the operation of the virtualized resource 406 to a time during the transfer of the state data 428, the operations of the virtualized resource 406 may be transferred from the source host 404 to the target host 402 with minimal interruptions to the ongoing operations of the virtualized resource 406.

Once the operations of the virtualized resource 406 resume on the target host 402 and/or the virtualized resource data 424 is fully copied to the target host 402, the target host 402 may transmit a migration confirmation 430 to the orchestrator 118. Upon receiving the migration confirmation 430, the orchestrator 118 may identify that the virtualized resource 406 was successfully live-migrated to the target host 402. According to some cases, the orchestrator 118 may perform additional functionality to enable the virtualized resource 406 to launch on the destination host 402. For instance, orchestrator 118 may instruct one or more routers in the internal network(s) transmitting the signaling 426 to update routing tables, such that data destined for the virtualized resource 406 is transmitted to the target host 402, rather than the source host 404. In some cases, the orchestrator 118 may instruct the source host 404 to delete a remaining copy of the virtualized resource data 424. Thus, the computing resources of the source host 404 may be unburdened by the virtualized resource 406, and the heat of the source host 404 may be reduced.

Figure 5:
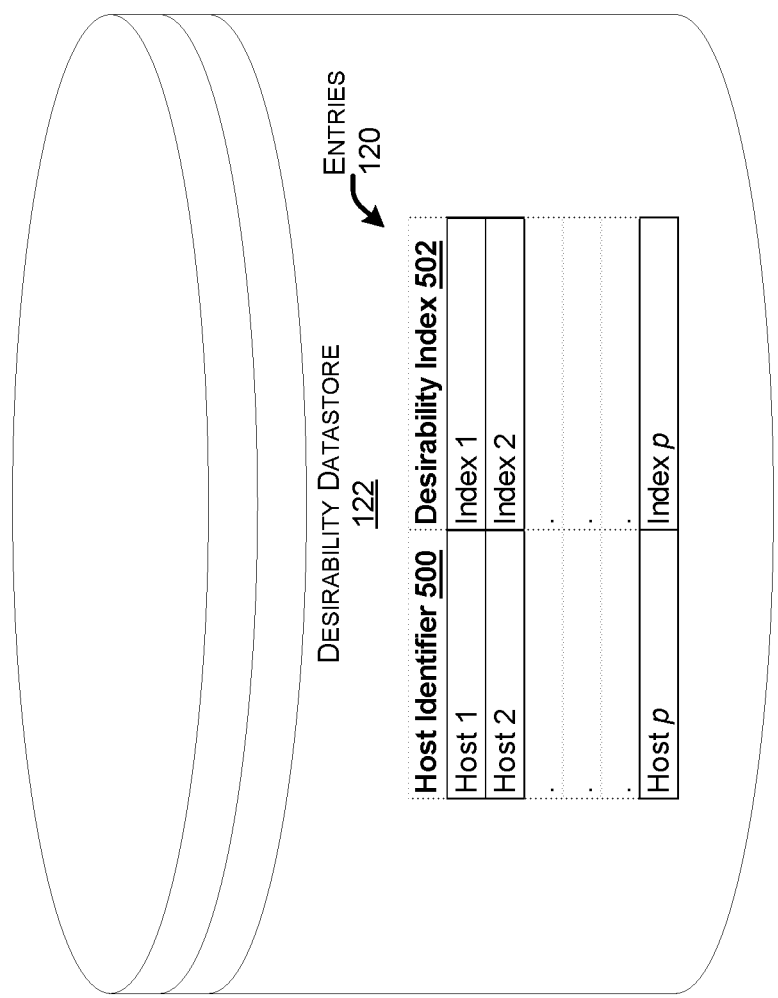
FIG. 5 illustrates an example of the desirability datastore including entries that store desirability indices of various hosts in a fleet.

FIG. 5 illustrates an example of the desirability datastore 122 and entries 120, which are also discussed above with reference to FIG. 1. The entries 120 of the desirability datastore 122 may be arranged into a table, such as a hash table. In various cases, the entries 120 may respectively correspond to hosts (e.g., to the first to nth updated hosts 102-1 to 102-*n* and the first to mth outdated hosts 106-1 to 106-*m*) within a fleet. A number of the entries may be p, wherein p is a positive integer. The desirability datastore 122 may therefore indicate the desirabilities of p hosts within a fleet as target hosts for live-migration.

Each one of the entries 120 may include a host identifier 500 and a desirability index 502. The host identifier 500 may uniquely identify at least one host corresponding to the entry. For example, the host identifier 500 "Host 1" can be an address (e.g., an IP address, a MAC address, or the like) of a first host, or some other unique identifier (e.g., a number, a string, or some other data type) identifying the first host. No two hosts within the fleet may share the same host identifier 500. For example, the host identifier 500 "Host 2" may appear in a single one of the entries 120. A host may correspond to a single entry among the entries 120. Accordingly, the host identifier 500 may be a primary key of the table of the entries 120. In some cases, the host identifier 500 can identify multiple hosts that are associated with a given desirability index, such as a pool of hosts associated with the given desirability index.

The desirability index 502 of a given entry among the entries 120 may indicate a desirability of the corresponding host(s) as a target host for live-migration. The desirability index 502 may be a scalable number, in some cases. According to some implementations, the desirability index 502 of each entry may be between an upper limit (e.g., 100) and a lower limit (e.g., 0). In some cases, a first host with a higher desirability index 502 may be a preferred target host over a second host with a lower desirability index 502, or vice versa. For example, if the desirability index 502 "Index 1" is greater than the desirability index 502 "Index 2," then a first host with host identifier 500 "Host 1" may be a more preferred target host than a second host with host identifier 500 "Host 2."

The desirability index 502 of a given entry may be generated, updated, and/or modified based on an update status of the corresponding host(s). In some cases, when a host has been updated with a backwards-compatible update, the corresponding desirability index 502 may be updated to indicate that the host is a more desirable target host than it was before the host was updated. In some examples, when a host has been updated with a backwards-incompatible update, the corresponding desirability index 502 may be updated to indicate that the host is a less desirable target host than it was before the host was updated. For instance, if the host with host identifier 500 "Host 1" has undergone a backwards-compatible update to its security software, then the desirability index 502 "Index 1" may be increased. In some examples, if the host with host identifier 500 "Host 2" has undergone a backwards-incompatible update to its resource manager, then the desirability index 504 "Index 2" may be decreased. Thus, the desirability index 502 of a given one of the entries 120 may be based on one or more updates that have been performed on the host corresponding to the given one of the entries 120.

The desirability indices 502 of entries 120 within the desirability datastore 122 may be updated based on changes in update status of any of the hosts within the fleet. The desirability indices 502 may be used to identify preferred target hosts within the fleet for live-migration of virtualized resources.

Figure 6:
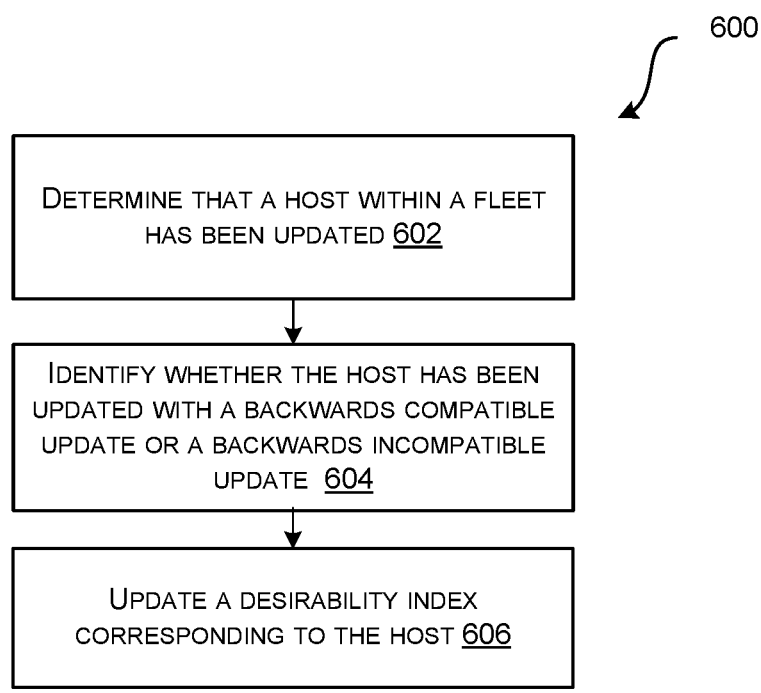
FIG. 6 illustrates an example process for updating a desirability index associated with a host based on an update status of the host.

FIG. 6 illustrates an example process 600 for updating a desirability index associated with a host based on an update status of the host. In various examples, the example process 600 can be performed by a desirability calculator, such as the desirability calculator 124 described above with reference to FIG. 1.

At 602, a host that has been updated may be determined. The host may be one of multiple hosts in a fleet that can provide computing resources on an as-needed basis for various virtualized resources. In some cases, the host can include at least one computing device, such as a server. An element of the host may be updated from a previous version to an updated version. The element may include software and/or hardware.

At 604, the process 600 may include identifying whether the host has been updated with a backwards-compatible update or a backwards-incompatible update. According to some examples, the updated version may be backwards-compatible with the previous version. In these examples, virtualized resources may be freely live-migrated from the updated host to another host with the previous version or the updated version of the element. In some cases, the updated version may be backwards-incompatible with the previous version. Accordingly, virtualized resources may not be live-migrated from the updated host to another host with the previous version of the element. Some examples of backwards-incompatible updates include certain hypervisor updates, kernel updates, updates to software running on offload cards, embedded software updates, or the like.

At 606, the process may include updating a desirability index corresponding to the host. In various examples, the desirability index can be updated based on the type of update performed on the host. If the host has undergone the backwards-compatible update, the desirability index may be modified to indicate that the host is a more desirable target host than the host was prior to the backwards-compatible update. For instance, if higher indices correspond to more desirable target hosts, the desirability index of the updated host may be increased. If, however, the host has undergone a backwards incompatible update, the desirability index may be modified to indicate that the host is a less desirable target host than the host was prior to the backwards-incompatible update. For instance, if higher indices correspond to more desirable target hosts, the desirability index of the updated host may be decreased.

Figure 7:
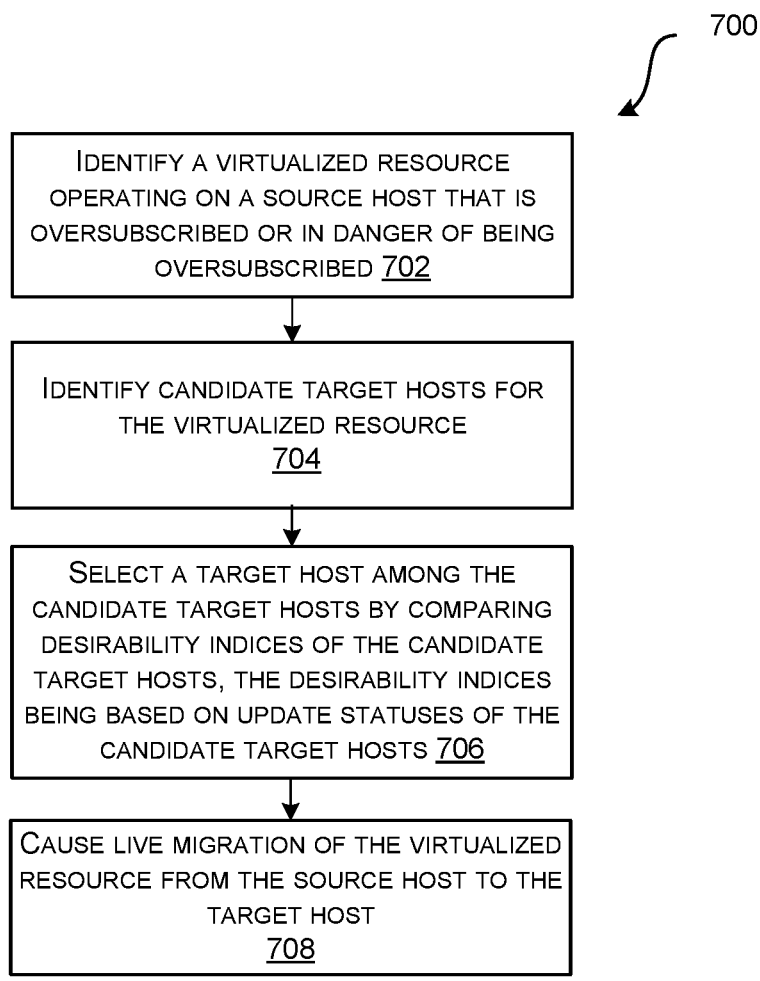
FIG. 7 illustrates an example process for facilitating live migration of a virtualized resource from a source host to a preferred target host.

FIG. 7 illustrates an example process 700 for facilitating live migration of a virtualized resource from a source host to a preferred target host. In various examples, the example process 700 may be performed by an orchestrator, such as the orchestrator 118 described above with reference to FIG. 1.

At 702, a virtualized resource operating on a source host that is oversubscribed or in danger of overheating may be identified. In various examples, the source host may be oversubscribed when a used capacity of computing resources of the source host may exceed a threshold (e.g., 90%). The computing resources may be used, at least in part, by the virtualized resource. In some cases, the source host may accommodate additional virtualized resources that also utilize the computing resources of the source host. For example, a CPU usage of the source host may exceed a threshold number of CPUs. In some cases, the used capacity of the computing resources predicted at some future time may exceed the threshold. Thus, the source host may be in danger of overheating.

At 704, candidate target hosts for the virtualized resource may be identified. The candidate target hosts may include at least a subset of a fleet of hosts that may include greater than a threshold of unused capacity. This threshold may correspond to an expected demand by the operations of the virtualized resource. In some cases, the candidate target hosts may include unused slots that are configured to accommodate the virtualized resource. According to various implementations, the candidate target hosts may omit any oversubscribed hosts within the fleet. In some examples, the candidate target hosts may include undersubscribed hosts within the fleet.

At 706, a target host among the candidate target hosts may be selected by comparing desirability indices of the candidate target hosts. The desirability indices may be based on update statuses of the candidate target hosts. For example, the desirability indices corresponding to at least some of the candidate target hosts with updated versions of backwards-incompatible updates may be smaller than desirability indices corresponding to at least some of the candidate target hosts with previous versions of backwards-incompatible updates. In some implementations, the desirability indices corresponding to at least some of the candidate target hosts with updated versions of backwards-compatible updates may be greater than desirability indices corresponding to at least some of the candidate target hosts with previous versions of the backwards-compatible updates. The target host may correspond to a maximum desirability index among the desirability indices, in some examples. In various cases, the desirability indices may be stored in a datastore, which may be accessed at 706.

At 708, the process 700 may include causing live migration of the virtualized resource from the source host to the selected target host. In some examples, an instruction to migrate the virtualized resource to the selected target host may be transmitted to the source host. In response to receiving the instruction, the source host may copy virtualized resource data to the target host while the virtualized resource is operating on the source host. Once at least some of the virtualized resource data is copied to the target host, state data indicating a volatile state of the ongoing operations of the virtualized resource may be transmitted to the target host. The virtualized resource may therefore resume operations on the target host.

Figure 8:
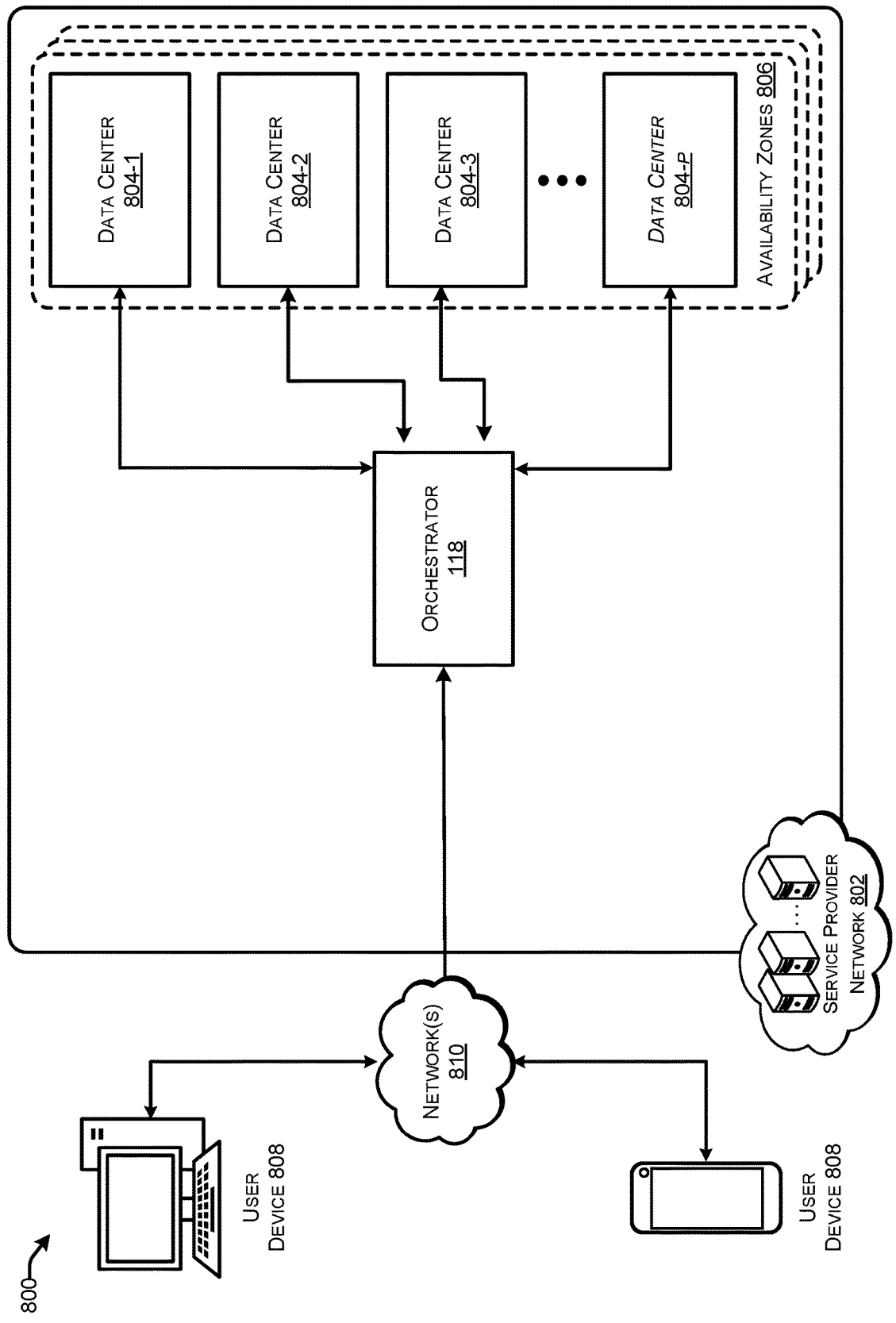
FIG. 8 is a system and network diagram showing an illustrative operating environment that includes a service provider network, which can be configured to implement aspects of various functionalities described herein.

FIG. 8 is a system and network diagram showing an illustrative operating environment 800 that includes a service provider network 802, which can be configured to implement aspects of various functionalities described herein. The service provider network 802 can provide computing resources, like Virtual Machine (VM) instances and storage, on a permanent or an as-needed basis.

Among other types of functionality, the computing resources provided by the service provider network 802 may be utilized to implement various services described above. For instance, the computing resources provided by the service provider network 802 can include various types of computing resources, such as data processing resources like VM instances, data storage resources, networking resources, data communication resources, network services, and the like. In some cases, the computing resources are provided via servers within the service provider network 802.

Each type of computing resource provided by the service provider network 802 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 802 can also be configured to provide other types of computing resources not mentioned specifically herein.

The computing resources provided by the service provider network 802 may be enabled in some implementations by one or more data centers 804-1 to 804-*p*, wherein p is a positive integer. The data center(s) 804-1 to 804-*p* might be referred to herein singularly as "a data center 804" or in the plural as "the data centers 804"). The data centers 804 are facilities utilized to house and operate computer systems and associated components. The data centers 804 can include redundant and backup power, communications, cooling, and security systems. The data centers 804 can also be located in geographically disparate locations, or regions. One region may include multiple availability zones 806. A region can be defined as a geographical area in which the cloud provider network 802 clusters data centers 804. Each region can include two or more availability zones 806 connected to one another via a private high-speed network, for example a fiber communication connection. An availability zone can refer to an isolated failure domain including one or more data center facilities with separate power, separate networking, and separate cooling from those in another availability zone. In some cases, availability zones 806 within a region may be positioned far enough away from one other that the same natural disaster should not take more than one availability zone 806 offline at the same time. One illustrative embodiment for a data center 804 that can be utilized to implement the technologies disclosed herein will be described below with regard to FIG. 9.

Various user devices 808 that utilize the service provider network 802 may access the computing resources provided by the service provider network 802 over the external network(s) 810, which may include any wired and/or network(s). The external network(s) 810 may include a Wide Area Network (WAN), such as the Internet, an intranet or an Internet Service Provider (ISP) network or a combination of such networks. In some cases, the external network(s) 810 may include a cloud-based network. In some examples, without limitation, a user device 808 operated by a client of the service provider network 802 may be utilized to access the service provider network 802 by way of the external network(s) 810. It should be appreciated that a Local Area Network (LAN), the Internet, or any other networking topology known in the art that connects the data centers 804 to remote clients and other users can be utilized. It should also be appreciated that combinations of such networks can also be utilized.

In particular implementations, the user device 808 may control a virtualized resource. The orchestrator 118 may cause the virtualized resource to launch in a target host and/or be migrated to a target host (e.g., in response to receiving an input from the user device 808). The target host may be within any of the data centers 804. In some cases, the orchestrator 118 may cause the virtualized resource to be live-migrated between a source host and the target host, which may be in the same or different data centers 804 in the service provider network 802. In various implementations, the orchestrator 118 may select the target host based on a desirability index associated with the target host. The desirability index may be based on an update status of the target host.

In some cases, although not specifically illustrated in FIG. 8, at least a portion of the orchestrator 118 can be hosted by one or more of the data centers 804. For instance, the orchestrator 118 may be hosted by one of the data centers 804 in relatively close geographical proximity to the user device 808. In some cases, the orchestrator 118 may be configured to migrate multiple virtualized resources between multiple servers in the same availability zone 806. In some cases, the orchestrator 118 may be hosted by one of the data centers 804 in the same availability zone 806 as one or both of the servers. In various implementations, at least one of the data centers 804 may further include at least one of the first to nth updated hosts 102-1 to 102-*n*, at least one of the first to mth outdated hosts 106-1 to 106-*m*, the heat manager 116, the desirability datastore 122, the desirability calculator 124, the update manager 126, the virtualized resource 406, the resource monitor 410, or some combination thereof.

Figure 9:
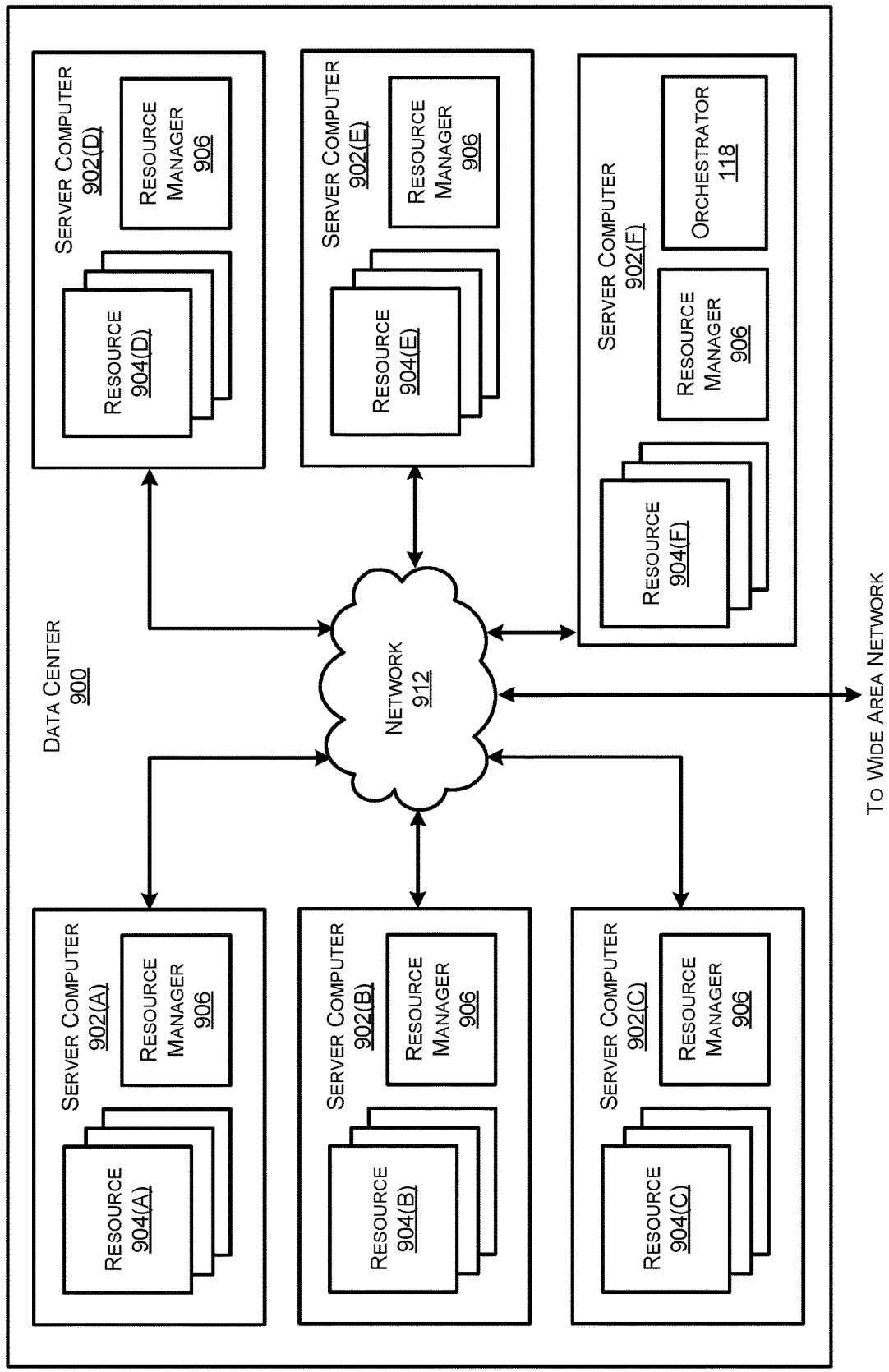
FIG. 9 is a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902(A)-902(F) (which might be referred to herein singularly as "a server computer 902" or in the plural as "the server computers 902") for providing computing resources 904(A)-904(F). In some examples, the resources 904 and/or server computers 902 may include, be included in, or correspond to, the computing resource network 802 described above with reference to FIG. 8.

The server computers 902 can be standard tower, rackmount, or blade server computers configured appropriately for providing the computing resources described herein (illustrated in FIG. 9 as the resources 904(A)-904(F)). As mentioned above, the service provider network 802 can accommodate virtualized resources such as Virtual Machine (VM) instances, as well as hardware computing systems, database clusters, computing clusters, storage clusters, data storage resources, database resources, networking resources, and other types of computing elements. Server computers 902 in the data center 900 can also be configured to provide network services and other types of services.

The server computers 902 (i.e., server computers 902(A)-902(F)) can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902.

At least one of the servers 902 (i.e., server computer 902(F)) may further execute an orchestrator 118, as described throughout the rest of this disclosure. In various implementations, at least one of the servers 902 may further execute at least one of the first to nth updated hosts 102-1 to 102-*n*, at least one of the first to mth outdated hosts 106-1 to 106-*m*, the heat manager 116, the desirability datastore 122, the desirability calculator 124, the update manager 126, the virtualized resource 406, the resource monitor 410, or some combination thereof.

In the example data center 900 shown in FIG. 9, an appropriate network 912 is also utilized to interconnect the server computers 902(A)-902(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804-1 to 804-*p* (described above with reference to FIG. 8), between each of the server computers 902(A)-902(F) in the data center 900. It should be appreciated that the configuration of the data center 900 described with reference to FIG. 9 is merely illustrative and that other implementations can be utilized.

Server computer 902(F) can execute some or all of the software components described above. For example, the server computer 902(F) may execute the orchestrator 118. The server computer 902(F) can also be configured to execute other components and/or to store data for providing some or all of the functionality described herein. In this regard, it should be appreciated that the services illustrated in FIG. 9 as executing on the server computer 902(F) can execute on many other physical or virtual servers in the data centers 804 in various embodiments.

Figure 10:
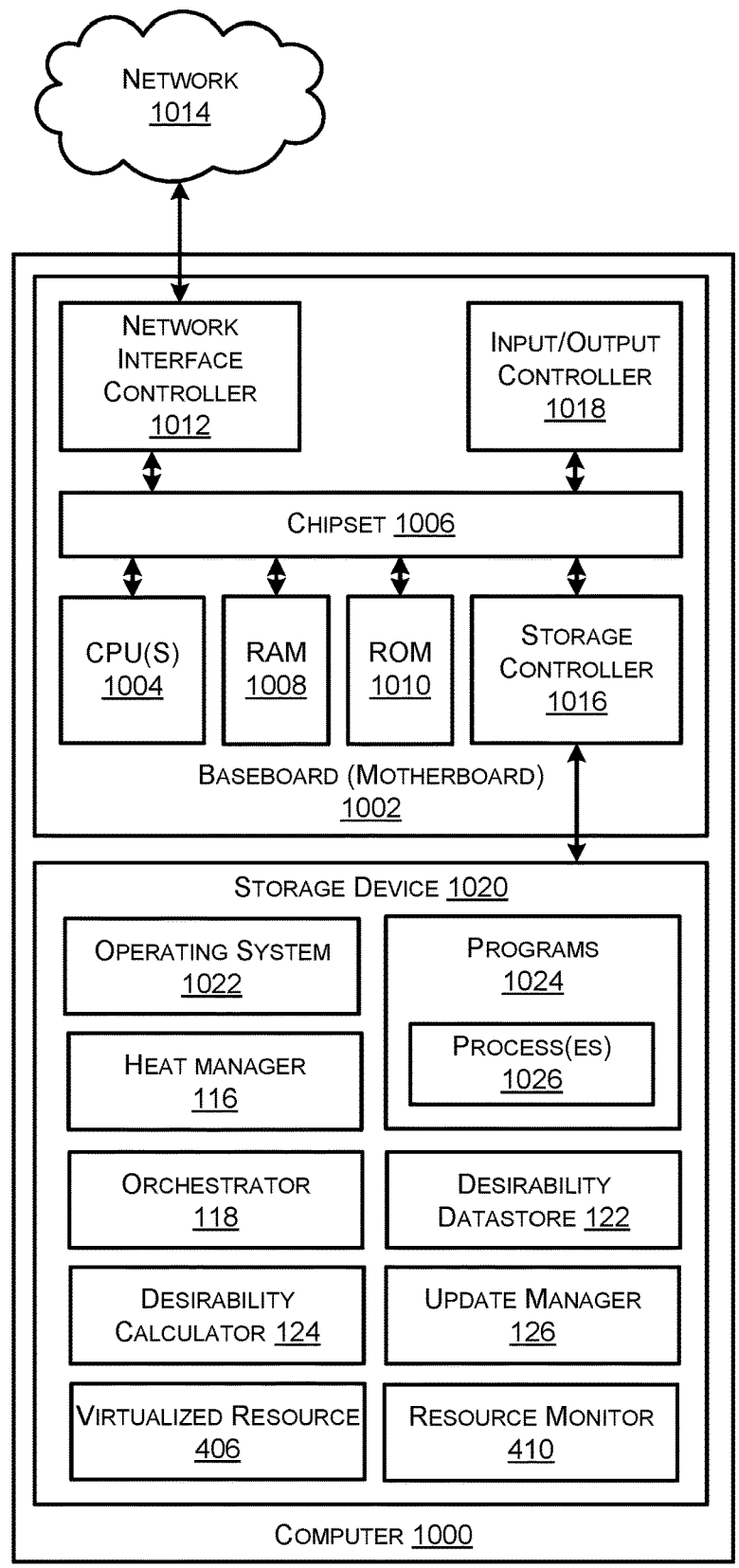
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more CPUs 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to Random Access Memory (RAM) 1008, used as the main memory in the computer 1000. The chipset 1006 can further provide an interface to a computer-readable storage medium such as a Read-Only Memory (ROM) 1010 or Non-Volatile RAM (NVRAM) for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network 1008. In various implementations, the network 1008 can include at least one of a cloud-based network, a Local Area Network (LAN), or a Wide Area Network (WAN). The chipset 1006 can include functionality for providing network connectivity through a Network Interface Controller (NIC) 1012, such as a gigabit Ethernet adapter. The NIC 1012 may be capable of connecting the computer 1000 to other computing devices over the network 1014. It should be appreciated that multiple NICs 1012 can be present in the computer 1000, connecting the computer 1000 to other types of networks and remote computer systems.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device.

The computer 1000 can include and/or be connected to a mass storage device 1020 that provides non-volatile storage for the computer. The mass storage device 1020 can store an operating system 1022, programs 1024 (e.g., processes 1026), as well as the heat manager 116, the orchestrator 118, the desirability datastore 122, the desirability calculator 124, the update manager 126, the virtualized resource 406, and the resource monitor 410, which have been described in greater detail herein. In various examples, at least one of the heat manager 116, the orchestrator 118, the desirability datastore 122, the desirability calculator 124, the update manager, the virtualized resource 406, or the resource monitor 410 may be omitted from the computer 1000. For instance, at least one of the heat manager 116, the orchestrator 118, the desirability datastore 122, the desirability calculator 124, the update manager, the virtualized resource 406, or the resource monitor 410 can be implemented on one or more other computers in communication with the computer 1000. The mass storage device 1020 can be connected to the computer 1000 through a storage controller 1016 connected to the chipset 1006. The mass storage device 1020 can consist of one or more physical storage units. The storage controller 1016 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1000 can store data on the mass storage device 1020 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the computer 1000 can store information to the mass storage device 1020 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1020 by detecting the physical states or characteristics of one or more particular locations within the physical storage units.

In addition to the mass storage device 1020 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 802 described above with reference to FIG. 8, and or any components included therein, may be supported by one or more devices similar to computer 1000. Stated otherwise, some or all of the operations performed by the service provider network 802, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1020 can store an operating system 1022 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1020 can store other system or application programs and data utilized by the computer 1000.

In one embodiment, the mass storage device 1020 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1 to 12. The computer 1000 can also include computer-readable storage media having instructions stored thereupon for performing any of the other computer-implemented operations described herein.

It will be appreciated that the computer 1000 might not include all of the components shown in FIG. 10, can include other components that are not explicitly shown in FIG. 10, or might utilize an architecture completely different than that shown in FIG. 10.

Further, in some implementations, the computer 1000 may correspond to a server configured to host one or more virtualized resources at a time. In some cases in which the computer 1000 is a sever currently hosting a virtualized resource, data associated with the virtualized resource may be stored in the storage device 1018. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

The environment and individual elements described herein may of course include many other logical, programmatic, and physical components, of which those shown in the accompanying figures are merely examples that are related to the discussion herein. Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
at least one processor; and
memory storing one or more instructions that, when executed by the at least one processor, cause the system to perform operations comprising:
determining that a first host has undergone a backwards-incompatible update, the backwards-incompatible update updating a previous version of a hypervisor into an updated version of the hypervisor, wherein the first host is part of a first capacity pool;
in response to determining that the first host has undergone the backwards-incompatible update, decreasing a first desirability index corresponding to placement of virtual machines (VMs) in the first capacity pool;
determining to perform a live migration of a VM currently running on a source host, wherein the source host is part of a second capacity pool that is compatible with migration into the first capacity pool as well as an additional capacity pool associated with a second desirability index;
based at least in part on determining that the second desirability index is greater than the first desirability index, selecting, among a plurality of hosts in the additional capacity pool, a target host for the live migration; and
causing the live migration of the VM from the source host to the target host.

2. The system of claim 1, the previous version being a first previous version and the updated version being a first updated version, wherein the operations further comprise:
determining that the first host has undergone a backwards-compatible update, the backwards-compatible update updating a second previous version of a memory system into a second updated version of the memory system; and
in response to identifying that the first host has undergone the backwards-compatible update, increasing the first desirability index.

3. The system of claim 2, the source host being a first source host, the live migration being a first live migration, the target host being a first target host, the operations further comprising:
determining to perform a second live migration of a second VM currently running on a second source host, wherein the second source host is part of the first capacity pool;
selecting the first host as a second target host for the second live migration; and
causing the second live migration of the second VM from the second source host to the second target host.

4. A method comprising:
determining to perform a live migration of a virtualized resource running on a source host, the source host utilizing a first version of an element that comprises at least one of hardware or software;
identifying candidate hosts comprising at least one first host and at least one second host;
determining that the at least one second host utilizes the first version of the element;
determining that a target host has undergone a backwards-compatible update, the target host being among the at least one second host;
determining that the at least one first host has undergone a backwards-incompatible update, the backwards-incompatible update converting the first version of the element into a second version of the element, the second version preventing live migration off of the at least one first host to at least one subsequent host utilizing the first version of the element; and
based on determining that the target host has undergone the backwards-compatible update and that the at least one first host has undergone the backwards-incompatible update, causing the source host to live-migrate the virtualized resource to the target host.

5. The method of claim 4, wherein the element comprises at least one of a hypervisor, a kernel, or software running on an offload card.

6. The method of claim 4, further comprising:
determining that another host among the at least one second host has refrained from undergoing the backwards-compatible update,
wherein causing the source host to live-migrate the virtualized resource to the target host is further based on determining that the another host has refrained from undergoing the backwards-compatible update.

7. The method of claim 4, wherein identifying the candidate hosts comprises identifying undersubscribed hosts among a fleet.

8. The method of claim 4, the virtualized resource being a first virtualized resource, the live migration being a first live migration, the source host being a first source host, the candidate hosts being first candidate hosts, the target host being a first target host, the method further comprising:
determining to perform a second live migration of a second virtualized resource running on a second source host, the second source host utilizing the second version of the element;
identifying second candidate hosts comprising the at least one first host and omitting the at least one second host, the second candidate hosts utilizing the second version of the element;
and
causing the second live migration of the second virtualized resource from the second source host to a second target host among the at least one first host.

9. The method of claim 4, wherein causing the source host to live-migrate the virtualized resource to the target host comprises:
causing the source host to:
copy data associated with the virtualized resource to the target host simultaneously as the virtualized resource is operating on the source host; and
transfer state data corresponding to operations of the virtualized resource on the source host to the target host.

10. The method of claim 4, further comprising:
receiving, from the target host, a message confirming that the virtualized resource has been migrated to the target host.

11. A system comprising:
at least one processor; and
memory storing one or more instructions that, when executed by the at least one processor, cause the system to perform operations comprising:
determining that at least one first host has undergone a backwards-incompatible update, the backwards-incompatible update updating a previous version of an element utilized by the at least one first host into an updated version of the element utilized by the at least one first host, the updated version of the element preventing live migration off of the at least one first host to at least one subsequent host utilizing the previous version of the element, the element comprising at least one of hardware or software;

identifying candidate hosts comprising the at least one first host and at least one second host, the at least one second host utilizing the previous version of the element;

and based on determining that the at least one first host has undergone the backwards-incompatible update, causing a target host among the at least one second host to launch a virtualized resource.

12. The system of claim 11, wherein the element comprises at least one of a hypervisor, a kernel, or software running on an offload card.

13. The system of claim 11, the operations further comprising:

determining that the target host has undergone a backwards-compatible update, wherein causing the target host to launch the virtualized resource is further based on determining that the target host has undergone the backwards-compatible update.

14. The system of claim 13, the operations further comprising:

determining that another host among the at least one second host has refrained from undergoing the backwards-compatible update, wherein causing the target host to launch the virtualized resource is further based on determining that the other host has refrained from undergoing the backwards-compatible update.

15. The system of claim 11, wherein causing the target host to launch the virtualized resource comprises causing live-migration of the virtualized resource from a third host to the target host.

16. The system of claim 15, wherein causing live-migration of the virtualized resource comprises:

transmitting, to the third host, a request to live-migrate the virtualized resource to the target host; and receiving, from the target host, a message confirming that the virtualized resource has been migrated to the target host.

17. The system of claim 11, the virtualized resource being a first virtualized resource, the candidate hosts being first candidate hosts, the target host being a first target host, the operations further comprising:

determining to live-migrate a second virtualized resource from a third host, the third host utilizing the updated version of the element;

identifying one or more second candidate hosts comprising the at least one first host and omitting the at least one second host, each of the one or more second candidate hosts utilizing the updated version of the element;

and causing the third host to live-migrate the second virtualized resource from the third host to a second target host among the at least one first host.

18. The system of claim 17, the previous version being a first previous version, the updated version being a first updated version, the element being a first element, the operations further comprising:

determining that the second target host has undergone a backwards-compatible update that converts a second previous version of a second element into a second updated version of the second element, wherein causing the third host to live-migrate the second virtualized resource from the third host to the second target host is based on determining that the second target host has undergone the backwards-compatible update.

* * * * *